United States Patent
Huang et al.

(10) Patent No.: US 11,538,302 B2
(45) Date of Patent: Dec. 27, 2022

(54) SYSTEM AND METHOD OF SELLING GOODS OR SERVICES, OR COLLECTING RECYCLE REFUSE USING MECHANIZED MOBILE MERCHANTRY

(71) Applicant: The Coca-Cola Company, Atlanta, GA (US)

(72) Inventors: Xiaoyan Huang, Atlanta, CA (US); Brock Kolls, Atlanta, GA (US); Chih-Shang Fu, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 802 days.

(21) Appl. No.: 15/116,508

(22) PCT Filed: Feb. 9, 2015

(86) PCT No.: PCT/US2015/015019
§ 371 (c)(1),
(2) Date: Aug. 3, 2016

(87) PCT Pub. No.: WO2015/120384
PCT Pub. Date: Aug. 13, 2015

(65) Prior Publication Data
US 2017/0011580 A1    Jan. 12, 2017

Related U.S. Application Data

(60) Provisional application No. 61/937,116, filed on Feb. 7, 2014.

(51) Int. Cl.
*G06Q 30/00* (2012.01)
*G07F 13/00* (2006.01)
(Continued)

(52) U.S. Cl.
CPC ............. *G07F 13/00* (2013.01); *G06Q 10/30* (2013.01); *G06Q 20/18* (2013.01); *G06Q 20/20* (2013.01);
(Continued)

(58) Field of Classification Search
CPC ....................................................... G06F 19/00
(Continued)

(56) References Cited

U.S. PATENT DOCUMENTS 8,812,482 B1 *  8/2014  Kapoor ................. G06F 16/273
                                                                    707/713
8,838,268 B2 *  9/2014  Friedman ................ A47L 9/009
                                                                    700/245
(Continued)

FOREIGN PATENT DOCUMENTS

CN      103136863 A      6/2013
CN      203006242 U      6/2013
(Continued)

OTHER PUBLICATIONS https://www.diva-portal.org/smash/get/diva2:859549/FULLTEXT01.pdf (Year: 2015).*
(Continued)

*Primary Examiner* — Russell S Glass
(74) *Attorney, Agent, or Firm* — Bates & Bates, LLC; Jim Patterson

(57) ABSTRACT

The present invention relates to a system and method of selling goods or services, or collecting recycle refuse using mechanized mobile merchantry, comprising positioning, by self-propelling, at least one of a mechanized mobile merchantry within a geographical boundary, allowing interaction with consumers, and effectuating selling of goods or services, or collection of recycle refuse with consumers. Other exemplary embodiments can include signaling a (Continued)

mechanized mobile merchantry with a consumer's mobile device to direct the merchantry to self-propel to the consumer's location, and utilizing usage logs and algorithms to optimize functionality of a fleet of merchantry and reposition the merchantry, as necessary, within a geographical boundary, to increase sales and consumer convenience. The present invention also relates to a waste collection system with option to deliver new food and beverage items includes a customer service robot comprising a slave computer and one or more waste receptacles to collect waste material. The customer service robot includes at least one robotic arm having at least three degrees of motion to facilitate collection from, e.g., tables and the like. The customer service robot is also capable of interfacing with a recycling unit and a master computer to control disposal of the collected waste.

15 Claims, 14 Drawing Sheets

(51) Int. Cl.
  *G06Q 30/02* (2012.01)
  *G06Q 30/06* (2012.01)
  *G06Q 10/00* (2012.01)
  *G06Q 20/18* (2012.01)
  *G06Q 20/20* (2012.01)

(52) U.S. Cl.
  CPC ..... *G06Q 30/0261* (2013.01); *G06Q 30/0266* (2013.01); *G06Q 30/0601* (2013.01); *G06Q 30/0639* (2013.01); *Y02W 90/00* (2015.05)

(58) Field of Classification Search
  USPC .......................................................... 705/16
  See application file for complete search history.

(56) References Cited

U.S. PATENT DOCUMENTS

| | | | |
|---|---|---|---|
| 2007/0106422 A1* | 5/2007 | Jennings | B25J 9/0084 700/245 |
| 2009/0194137 A1 | 8/2009 | Friedman et al. | |
| 2010/0100241 A1 | 4/2010 | Jarisch et al. | |
| 2010/0161397 A1 | 6/2010 | Gauthier et al. | |

FOREIGN PATENT DOCUMENTS

| | | | |
|---|---|---|---|
| JP | 2002-260076 A | | 9/2002 |
| JP | 2006 102861 A | | 4/2006 |
| JP | 2006102861 A | * | 4/2006 |
| JP | 2006102861 A | | 4/2006 |
| JP | 2007-048324 A | | 2/2007 |
| JP | 2008055578 A | | 3/2008 |
| JP | 2010157018 A | | 7/2010 |
| KR | 10-2013-0049222 A | | 5/2013 |
| WO | 2007041295 A2 | | 4/2007 |

OTHER PUBLICATIONS

International Search Report dated May 22, 2015 of PCT/US2015/015019, 3 pages.

Gabriele Ferri et al; "DustCart, an autonomous robot for door-to-door garbage collection: From Dustbot project to the experimentation in the small town of Peccioli"; Roboitcs and Automation (ICRA), 2011 IEEE International Conference on, IEEE, May 9, 2011; pp. 655-660, xp032034075, DOI: 10 1109/ICRA.2011.5980254; ISBN: 978-1-61284-386-5.

Pericle Salvini et al; "The Robot DustCart"; IEEE Robotics & Automation Magazine, IEEE Service Center, Piscataway, NJ, US; vol. 18, No. 1, Mar. 1, 2011; pp. 59-67, XP011354070, ISSN: 1070-9932, DOI: 10.1109/MRA.2010.940153.

Pinheiro, Tiago; European Search Report, dated Nov. 7, 2017, pp. 1-12, The Hague, Netherlands.

Hu, Yan; Chinese Office Action; dated Jul. 9, 2019; pp. 1-20; National Intellectual Property Administration (CNIPA); Beijing, China.

Kentaro Takase; Decision of Rejection; Japanese Office Action; dated Apr. 22, 2019; pp. 1-3; Japanese Patent Office, Tokyo, Japan.

Hu, Yan; Decision of Rejection; dated Nov. 4, 2019; pp. 1-24; National Intellectual Property Administration (CNIPA); Beijing, China.

Examiner; 1st Office Action; dated May 14, 2018; pp. 1-3; Mexican Institute of Industrial Property (IMPI); Mexico City, Mexico.

Examiner; 2nd Office Action; dated Jul. 11, 2019; pp. 1-6; Mexican Institute of Industrial Property (IMPI); Mexico City; Mexico.

* cited by examiner

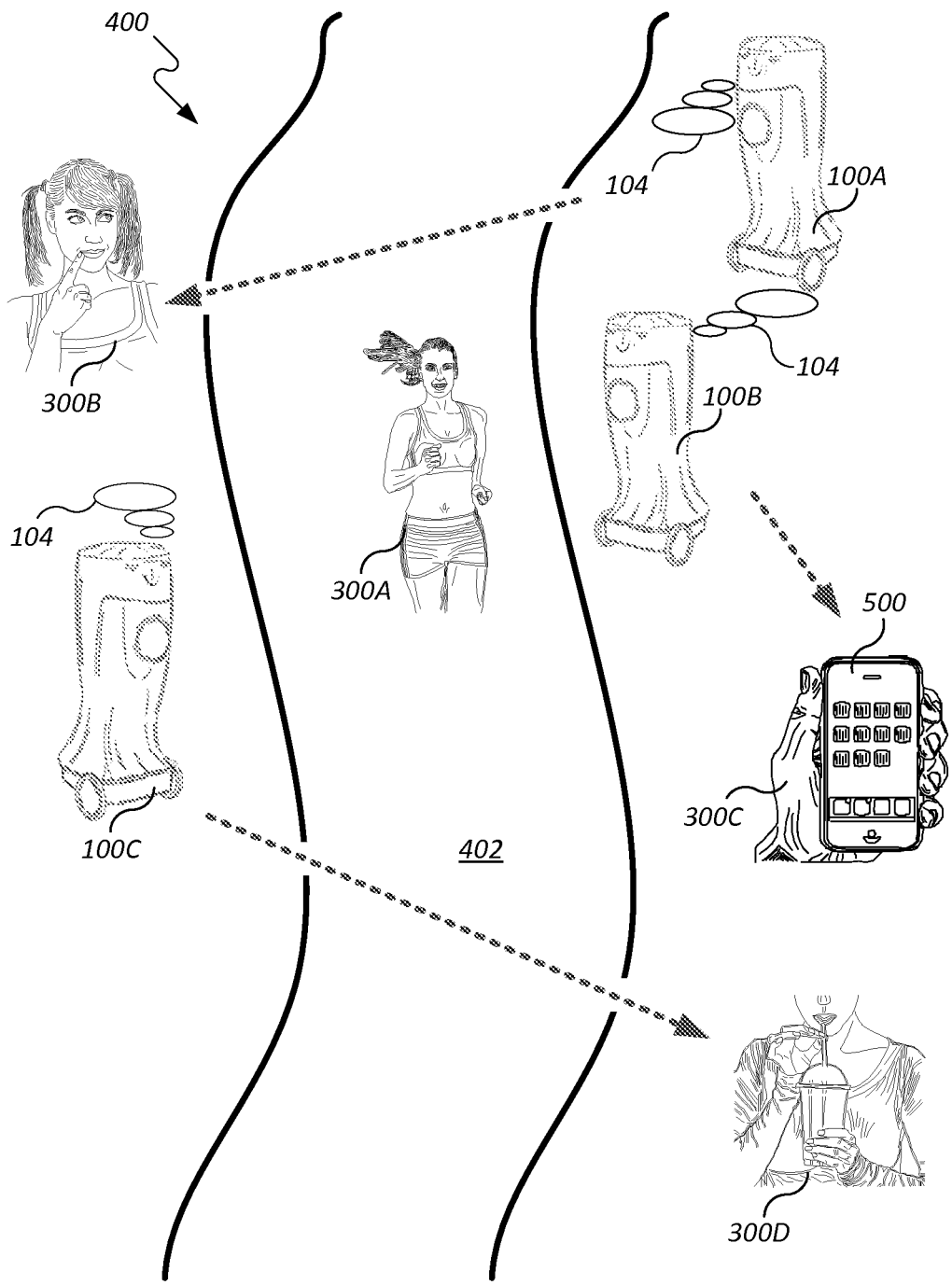

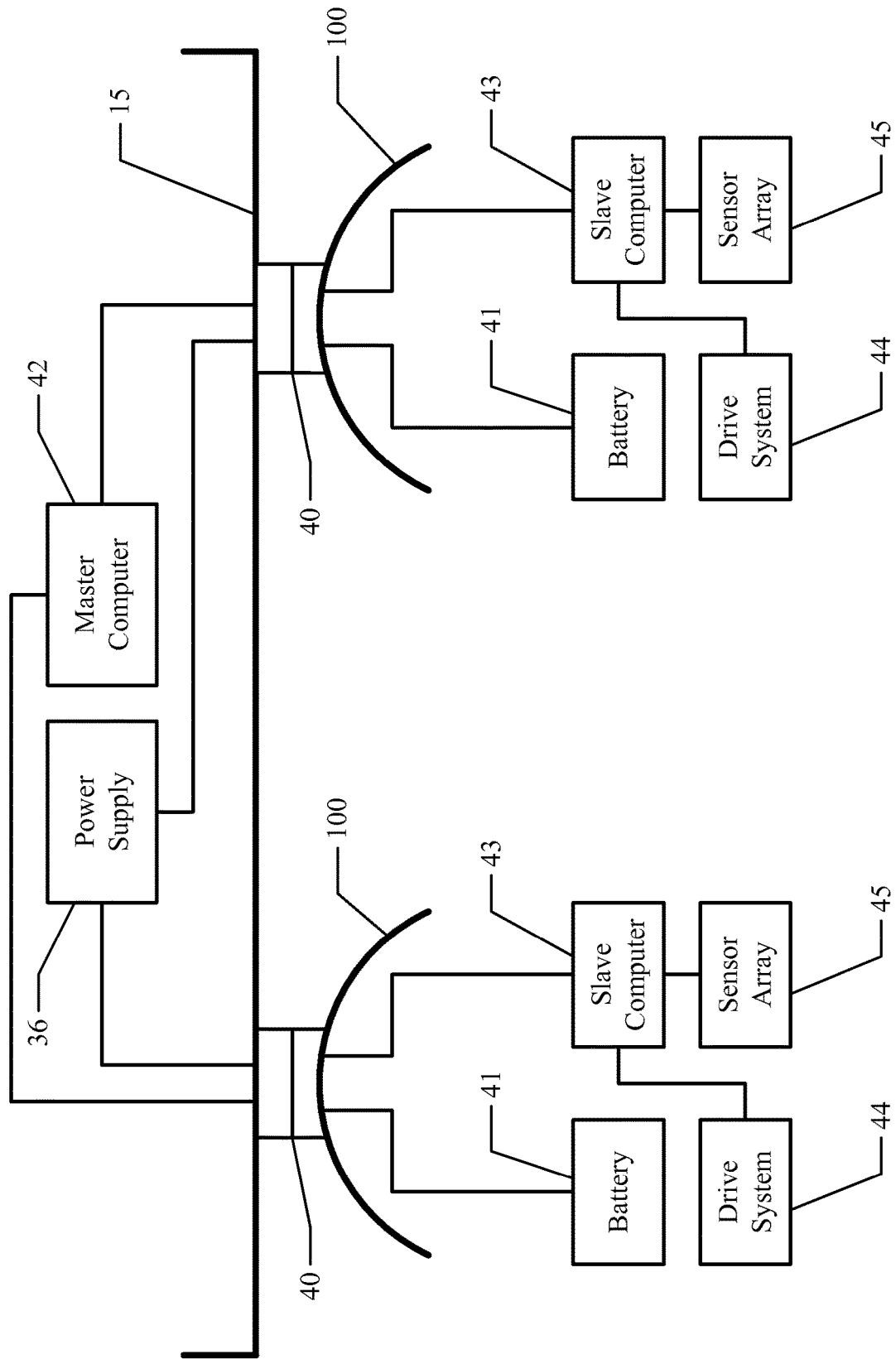

SYSTEM AND METHOD OF SELLING GOODS OR SERVICES, OR COLLECTING RECYCLE REFUSE USING MECHANIZED MOBILE MERCHANTRY

This application is being filed on 9 Feb. 2015, as a PCT International Patent application and claims priority to U.S. Provisional Application Ser. No. 61/937,116, filed Feb. 7, 2014, the subject matter of which is incorporated by reference in its entirety.

TRADEMARKS

COCA-COLA® is a registered trademark of The Coca-Cola Company, Atlanta, Ga., U.S.A. Other names used herein may be registered trademarks, trademarks or product names of The Coca-Cola Company or other companies.

TECHNICAL FIELD OF THE INVENTION

The invention relates to a system and method of selling goods or services, or collecting recycle refuse using mechanized mobile merchantry, and particularly to positioning, by self-propelling, at least one of a mechanized mobile merchantry within a geographical boundary, allowing interaction with consumers, and effectuating selling of goods or services, or collection of recycle refuse with consumers.

BACKGROUND OF THE INVENTION

Before our invention vending machines and refuse receptacles were statically located in a defined geography. In this regard, the vending machine and refuse receptacles often were not located in convenient locations for consumer, but rather located near access to electrical power to operate the vending machines. In addition, such vending machines and receptacles could not easily be relocated where consumers take up temporary resident, such as while picnicking or playing a sport; certain the vending machine could not be continuously moving to seek out consumers to make sales and collect refuse.

Another shortcoming can be that in the evening and/or during hours the geography is closed, the vending machines and refuse receptacles often remain distributed throughout the geography, as it is too difficult and time consuming to try to retrieve or otherwise move the vending machines and receptacles to a central location every day. Further complicating matters is that vending machines filled with product are too heavy and dangerous to move with the weight of the product stored inside. This shortcoming would necessarily require that the vending machines first be unloaded of product before trying to deploy, move, or retrieve the vending machine. Redeployment the next day would incur similar hassles of first having to move the vending machines to the desired locations and then moving the product to the vending machine location, then, in a very time consuming manner, stock the product into the vending machine.

Another shortcoming can be a limitation of consumer choice and the types of vending platforms that can be deployed in an exposed to vandalism after hours environment. In this regard, and most practically, only secured vending machines can be deployed in unattended public locations. This limits consumer choice and largely precludes other vending and dispenser platforms such as bulk water type dispensers, fountain, and cooler type dispenser platforms. In addition to the potential vandalism and need for secure vending equipment, hygiene can be a problem for outdoor equipment and as such dispensing platforms such as bulk water and fountain where product is not necessarily prepackaged can be a problem. As for coolers with opening and closing doors with consumer access, without routine hygiene maintenance the equipment can become unclean.

Another shortcoming of current vending machines and refuse receptacles can be that they do not share usage data amongst themselves and therefore it can be difficult to tell where the best locations for the equipment placement would be (provided power access is available). In addition, there is no way for the least performing machines at the moment can identify the most performing machine to that more product sales can more consumer convenience can be realized.

In view of these shortcomings and others there is a long felt need for a better way to deploy, retrieve, and optimize sales and consumer interaction and convenience when selling goods or services from vending and dispenser platforms, or collecting recycle refuse that gives rise to the present invention.

Furthermore, automated robots have been conceptualized for decades to assist humans with everyday tasks. In recent years, these concepts have been realized for very specific applications. In some instances, robots provide improved convenience. Yet in other instances, robots perform tasks more efficiently or more safely than humans.

Techniques for making work easier, or for providing service during time periods when humans may not be available, are described in the following related art references.

U.S. Pat. No. 4,889,210 A to Aguilar et. al., describes a robot for serving a product dispensed from a product dispenser to a customer including a processor and a robotic arm.

U.S. Pat. No. 7,848,838 B2 to Gershenfeld et. al., describes a digital assembler for creating three-dimensional objects from digital materials made out of discrete components comprises an assembly head, error correction mechanism, parts feeder, and a control system.

U.S. Pat. No. 7,577,498 B2 to Jennings, et. al., describes a robotic beverage server having a robotic arm and a beverage dispenser.

U.S. Pat. No. 8,359,122 B2 to Koselka et. al., describes an autonomous personal service robot to monitor its owner for symptoms of distress and to provide assistance.

U.S. Pat. No. 8,509,947 B2 to Jarisch et. al., describes an autonomous mobile robotic device, having an active motion mechanism and an integrated machine for producing beverages.

U.S. Pat. No. 8,583,282 B2 to Angle et. al., describes a mobile robot guest for interacting with a human resident includes a room-traversing search procedure prior to interacting with the resident, and may verbally query whether the resident being sought is present.

US 20060037969 A1 to Jennings et. al., describes a robotic beverage server and a beverage ordering system connected to a computer.

US 20120061155 A1 to Berger et. al., describes a humanoid robot having a mobile base and a vertically extensible torso assembly.

CN 102323821 A (machine translated English) to Long, describes a robot for self-service restaurants which traverses a track system from location to location.

CN 202414559 U (machine translated English) to Tiantian, describes an intelligent robot type garbage can which has various compartments for garbage.

ES 2249123 B1 to Segui, describes a machine for the automatic extraction and classification of recyclable materials based on artificial vision technology.

JP2011245577A assigned to Honda Motor, describes restaurant robots capable of synchronizing real-time restaurant information affecting delivery time to serve meals to customers most efficiently.

There is an ongoing need for automated disposal of waste. More importantly, there is a current need to use more efficient interfaces to accomplish this task, especially interfaces that are more precise and that consume less human time.

SUMMARY OF THE INVENTION

The shortcomings of the prior art are overcome and additional advantages are provided through the provision of a system of selling goods or services, or collecting recycle refuse using mechanized mobile merchantry, the system comprising at least one of a mechanized mobile merchantry platform. The mechanized mobile merchantry platform further comprising a merchantry control system, an expressive lighting display interconnect with and operationally related to the computing, a sensor array for operationally related to the merchantry control system, the sensor system configured to perceive surrounds of the mechanized mobile merchantry and for interacting with a consumer, and a computer readable medium operational related to the merchantry control system. The computer readable medium is encoded with instructions which when executed by the merchantry control system perform the Steps of positioning at least one of a mechanized mobile merchantry, which self-propel to a first designated geographical location, within a geographical boundary, watching, by way of the sensor array, for at least one of a consumer within range from the mechanized mobile merchantry, moving, by self-propel, the mechanized mobile merchantry to the location of the consumer, where interaction between the consumer and the mechanized mobile merchantry is facilitated, illuminating lights, by way of the expressive lighting display, which or arranged in a predefined pattern to express visually a plurality of emotional states, and effectuating by way of the mechanized mobile merchantry, selling of goods or services or collection of recycle refuse with the consumer.

In addition, the shortcomings of the prior art are overcome and additional advantages are provided through the provision of a method of selling goods or services, or collecting recycle refuse using mechanized mobile merchantry. The method comprising positioning at least one of a mechanized mobile merchantry, which self-propel to a first designated geographical location, within a geographical boundary; signaling, by way of a consumer using a mobile device, the mechanized mobile merchantry to self-propel to and interact with the consumer at the consumer location, establishing a data communication link between the mobile device and a beacon device, the beacon device being operationally related to and positioned on the mechanized mobile merchantry, wherein the beacon device effectuates the ability of the mechanized mobile merchantry to locate and move, self-propelled, to the mobile device location, and effectuating by way of the mechanized mobile merchantry, selling of goods or services or collection of recycle refuse with the consumer.

In addition, the shortcomings of the prior art are overcome and additional advantages are provided through the provision of a method of selling goods or services, or collecting recycle refuse using mechanized mobile merchantry. The method comprising positioning at least one of a mechanized mobile merchantry, which self-propels to a first designated geographical location, within a geographical boundary, allowing the mechanized mobile merchantry to interact with consumers selling goods or services, or providing recycle refuse collection, and developing, by way of each of the mechanized mobile merchantry, a USED BY CONSUMER LOG which monitors sales, recycle refuse collection, or social interactions between consumers and a HUMAN TRAFFIC PATTERN LOG which monitors at least human traffic proximate each of the mechanized mobile merchantry.

The method further comprising determining, by way of a MERCHANTRY OPTIMIZATION ALGORITHM, based, in part, on at least the USED BY CONSUMER LOG and the HUMAN TRAFFIC PATTERN LOG a second designated geographical location for at least some of the mechanized mobile merchantry, repositioning, at least some of the mechanized mobile merchantry, which self-propels to the second geographical location, to increase human traffic locomotion past the mechanized mobile merchantry in attempt to increase sales, meet consumer recycle refuse needs, or a combination thereof, and returning to the step of allowing.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

The invention also provides for a customer service robot capable of operation in a food or beverage consumption area, such as a kitchen, dining room, restaurant, cafeteria or outdoor festival. More particularly, the invention includes optionally delivering new food and beverage items in connection with collection, sorting, compacting and dispensing of waste materials.

It would be desirable for companies, restaurants, and people in general to have an integrated robot that is capable of food or beverage delivery and/or waste collection and sorting at or near the point of food or beverage consumption, and that is also responsible for interfacing with a recycling unit for recycling of waste. Such a system is described herein.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of a geographical boundary comprising a plurality of consumers and a plurality of mechanized mobile merchantry selling goods or services, or providing recycle refuse collection;

FIG. 16 depicts a schematic view of a power and control system for a recycling unit and exemplary robots.

The detailed description explains the preferred embodiments of the invention, together with advantages and features, by way of example with reference to the drawings.

DETAILED DESCRIPTION OF THE INVENTION

Figure 1A:
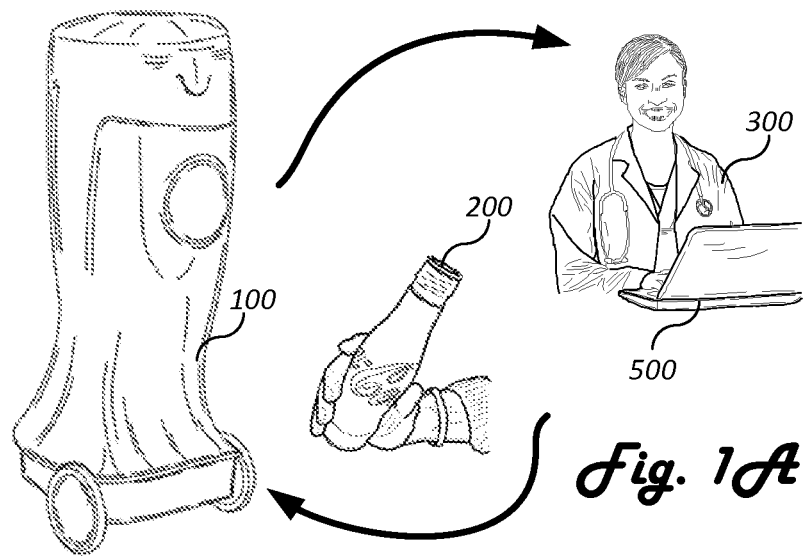
FIG. 1A illustrates one example of a mechanized mobile merchantry self-propelling to a consumer to collect an inventory item as recycle refuse from the consumer.

Turning now to the drawings in greater detail, it will be seen that in FIG. 1A there is illustrated one example of a mechanized mobile merchantry 100 self-propelling to a consumer 300 to collect an inventory item as recycle refuse from the consumer 300. In an exemplary embodiment, a consumer 300 can either signal the mechanized mobile merchantry 100 to come to the consumer's location by way of a mobile device 500. Such a mobile device 500 can be a mobile or smart phone, laptop, tablet, or other mobile device, as may be required and or desired in a particular embodiment. In addition, the mechanized mobile merchantry 100 can use perception sensors 114, or other sensory array 118 sensors to identify the consumer and by self-propel approach the consumer so that the consumer 300 can interact with the mechanized mobile merchantry 100.

In this exemplary embodiment, once the consumer's location is known, a mechanized mobile merchantry 100, which is configured to have modular functionality of recycle refuse receptacles 126A (illustrated in at least FIG. 5) can received from the consumer 300 used and/or empty packaging material as refuse collection, such as beverage packaging 200, as recycle waste. In this regard the mechanized mobile merchantry can serve the purpose of collecting recycle refuse from the consumer.

In another exemplary embodiment, a mechanized mobile merchantry 100 with modular functionality equipped to serve consumer 300 a beverage 200 can inform other mechanized mobile merchantry 100 with modular functionality equipped to collect recycle refuse to return to the consumer 300 at some later time to collect the recycle refuse, such as a used or empty beverage packaging 200. In this regard, one mechanized mobile merchantry 100 can serve the consumer 300 and another mechanized mobile merchantry 100 can return to the consumer 300, at a later time, to collect the recycle refuse.

In another exemplary embodiment, a single mechanized mobile merchantry 100 can be dually modularly configured to both serve beverages in beverage packaging 200 and collect recycle refuse, such as used and/or empty beverage packaging 200. In this regard, a single mechanized mobile merchantry 100 can serve the consumer 300 and then return later to collect the empty beverage packaging 200 as recycle refuse.

Use of the term "recycle refuse" or "refuse collection", in the present invention, is intended to mean trash or garbage, to the extent that recycle refuse is trash or garbage made from recyclable materials and can be recycled in some manner. In general, and with regards to specifically beverage packaging, aluminum cans and bottle packaging, plastic bottle packaging, and paper cup packaging are all typically made from recyclable materials and can be considered recycle refuse or refuse for collection in the present invention. As not to be limited to beverage packaging only, many other types and kinds of trash or garbage can be made from recyclable materials and, after use by a consumer, can be considered recycle refuse or refuse for collection in the present invention.

Use of the term "mechanized mobile merchantry", in the present invention, is intended to mean a machine or automated device which is self-propelled and used for the purpose of the business of commerce or trade. In general, a plurality of mechanized mobile merchantry 100 is one or more machines or automated devices, capable of self-propelling, that can sell goods or service, or collect recycle refuse. Such mechanized mobile merchantry 100 comprise one or more functionality modules, better illustrated in at least FIG. 5, which can include vending module 126D, self-serve cooler 126C, controller access self-serve cooler 126C (also referred to as self-serve cooler 126C), fountain dispenser 126E, bulk water dispenser 126B, pet treat dispenser, recycle refuse receptacles 126A, social media interaction station, digital signage, or combinations thereof.

Figure 1B:
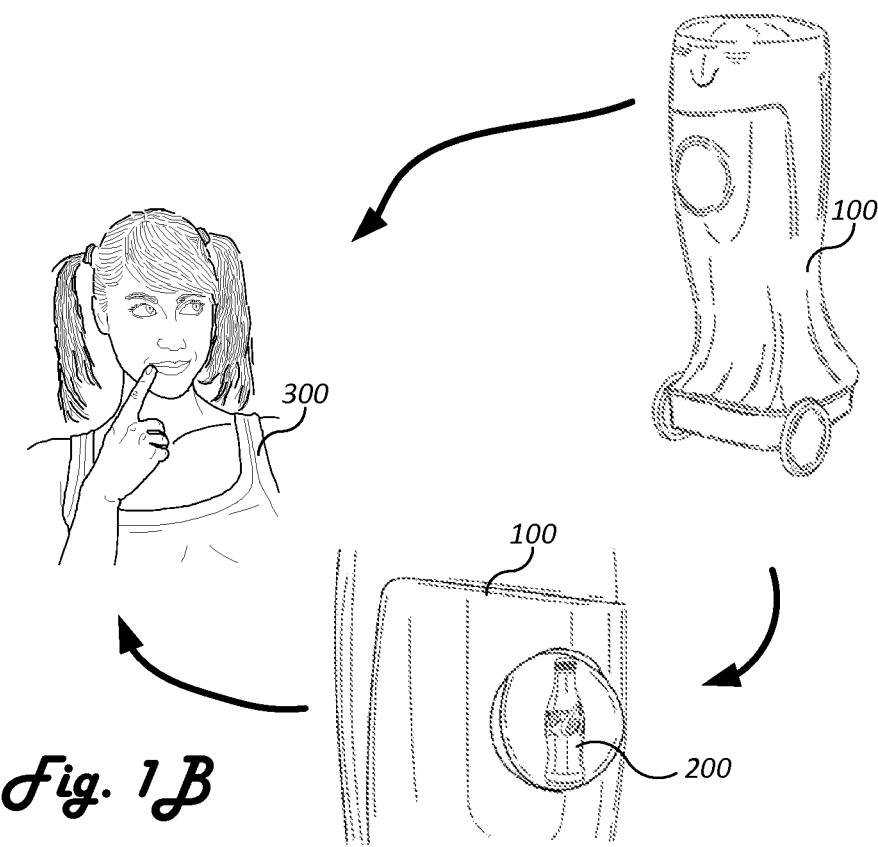
FIG. 1B illustrates one example of a mechanized mobile merchantry identifying a consumer then self-propelling to the consumer to allow the consumer to buy an inventory item.

Referring to FIG. 1B the is illustrated one example of a mechanized mobile merchantry 100 identifying a consumer 300 then self-propelling to the consumer 300 location to allow the consumer 300 to buy an goods or service inventory item. In an exemplary embodiment, a mechanized mobile merchantry 100 can be signaled to come to the consumer 300 or identify, by way of sensor array 118, a consumer 300 and self-propel to the consumer's location. Once there the consumer 300 can interact with the mechanized mobile merchantry 100 allowing the consumer to transact the buying of goods or services. Such buying of goods or services can include vending beverages, or as better illustrated in at least FIG. 5 self-serve cooler 126C, allowing the consumer to transact the buying of goods or services, by way of other functional modules such as controller access self-serve cooler 126C, fountain dispenser 126E, bulk water dispenser 12B, pet treat dispenser, recycle refuse receptacles 126A, social media interaction station, digital signage, or combinations thereof.

Referring to FIG. 2 there is illustrated one example of a geographical boundary 400 comprising a plurality of consumers 300 and a plurality of mechanized mobile merchantry 100 selling goods or services, or providing recycle refuse collection. In an exemplary embodiment, for example and not a limitation, a geographical boundary 400 can be an office, a park, hotel, or other geographical boundary 400, as may be required and/or desired in a particular embodiment. FIG. 2 illustrates several ways in which a plurality of mechanized mobile merchantry 100 can be deployed, within a geographical boundary, and optimize themselves in location and modular functionality to best serve a population of consumers 300A-D.

In one exemplary embodiment a jogger or walker, referred to as consumer 300A, along a pathway 402 in the normal course of following a path 402 can necessarily pass by several of the mechanized mobile merchantry 100A-C. In this regard, each of the mechanized mobile merchantry 100A-C is self-propelled and can each be positioned at a first designated geographical location, within a geographical boundary. The mechanized mobile merchantry 100A-C can be allowed to interact with consumers selling goods or services, or providing recyclable refuse collection. For disclosure purposes, though FIG. 2 illustrates three mechanized mobile merchantry 100A-C in an exemplary embodiment any number of mechanized mobile merchantry can be deploy and equipped with varying modular functionality, as may be required and/or desired in a particular embodiment.

Each of the mechanized mobile merchantry 100, can develop a USED BY CONSUMER LOG which monitors sales, recycle refuse collection, or social interactions between consumers and a HUMAN TRAFFIC PATTERN LOG which monitors at least human traffic proximate each of the mechanized mobile merchantry. The mechanized mobile merchantry 100, by way of a MERCHANTRY OPTIMIZATION ALGORITHM, based, in part, on at least the USED BY CONSUMER LOG and the HUMAN TRAFFIC PATTERN LOG can determine a second designated geographical location for at least some of the mechanized mobile merchantry 100A-C to increase sales and convenience of access for the consumer.

Use of the term "USED BY CONSUMER LOG", in the present invention, is intended to mean a data log or electronic record of at least the type, kind, date, time, and items bought or used by the consumer, and/or other relevant transaction information, as may be required and/or desired in a particular embodiment. In general, the USED BY CONSUMER LOG is a record of what the consumer did gathered in a way and form that is useful for analysis across a plurality of mechanized mobile merchantry 100 to impart knowledge as to the activity and suggestion of how to increase the activity at each of the mechanized mobile merchantry.

Use of the term "HUMAN TRAFFIC PATTERN LOG", in the present invention, is intended to mean a data log or electronic record of at least the consumer walking or movement patterns proximate the mechanized mobile merchantry 100. In general, is it the ability to quantify the frequency, duration, and other interaction behaviors proximate the mechanize mobile merchantry, and/or other relevant human traffic pattern insight information, as may be required and/or desired in a particular embodiment gathered in a way and form that is useful for analysis across a plurality of mechanized mobile merchantry 100 to impart knowledge as to the activity and suggestion of how to increase the activity at each of the mechanized mobile merchantry.

Use of the term "MERCHANTRY OPTIMIZATION ALGORITHM", in the present invention, is intended to mean a decision making algorithm that can evaluate data from a plurality of mechanized mobile merchantry in the form of USED BY CONSUMER LOG, HUMAN TRAFFIC PATTERN LOG, and other data to optimize the number, functional module configuration, location, inventory, and other aspects to increase or otherwise optimize sales and consumer engagement and experience with the plurality of mechanized mobile merchantry within a geographical boundary. In general, the MERCHANTRY OPTIMIZATION ALGORITHM determines the optimum mix of type, kind, number, and location of mechanized mobile merchantry to optimize the sales and positive impact on consumers.

In an exemplary embodiment, the mechanized mobile merchantry 100A-C can data communicate with each other by way of communication 104, exchanging at least USED BY CONSUMER LOG and the HUMAN TRAFFIC PATTERN LOG, and determining by way of a MERCHANTRY OPTIMIZATION ALGORITHM, through self-learning among other things, whether the current first designated geographical location is the optimal location or if a second designated geographical location is better. Such determination can be coordinated with other of the mechanized mobile merchantry 100A-C, by way of, communication interface 104, and when appropriate and if necessary the mechanized mobile merchantry can redeploy themselves to the second designated geographical location, merchantry in attempt to increase sales, meet consumer recycle refuse needs, or a combination thereof.

Figure 6:
FIGS. 6, 7, 8, 9, 10, 11, 12 illustrate examples of a method of selling goods or services, or collecting recycle refuse using mechanized mobile merchantry 100.

In an alternative exemplary embodiment, each of the mechanized mobile merchantry 100A-C can data communicate with a data processing resource 602, by way of a global network 604 which is better illustrated in at least FIG. 6. A global network 604 can be the Internet. In this configuration, each of the mechanized mobile merchantry 100A-C can data communicate at least USED BY CONSUMER LOG and the HUMAN TRAFFIC PATTERN LOG data with the data processing resource 602 so that the data processing resource 602 can determine by way of a MERCHANTRY OPTIMIZATION ALGORITHM which of the mechanized mobile merchantry 100A-C, if any, should be repositioned thus self-propelling to a second geographical location, to increase human traffic locomotion past the mechanized mobile merchantry in attempt to increase sales, meet consumer recycle refuse needs, or a combination thereof.

In another exemplary embodiment, a combination of or switching between self-learning and server based central control, also referred to as cloud based learning, by way of data processing resource 602 can be effectuated, as may be required and/or desired in a particular embodiment.

Beyond the positioning and repositioning capabilities of the mechanized mobile merchantry 100A-C and the mechanized mobile merchantry 100A-C ability to deduce best locations and self-propel to optimize sales and consumer engagement and convenience, each of the mechanized mobile merchantry can also act autonomously in motion and interaction with consumers.

Figure 3:
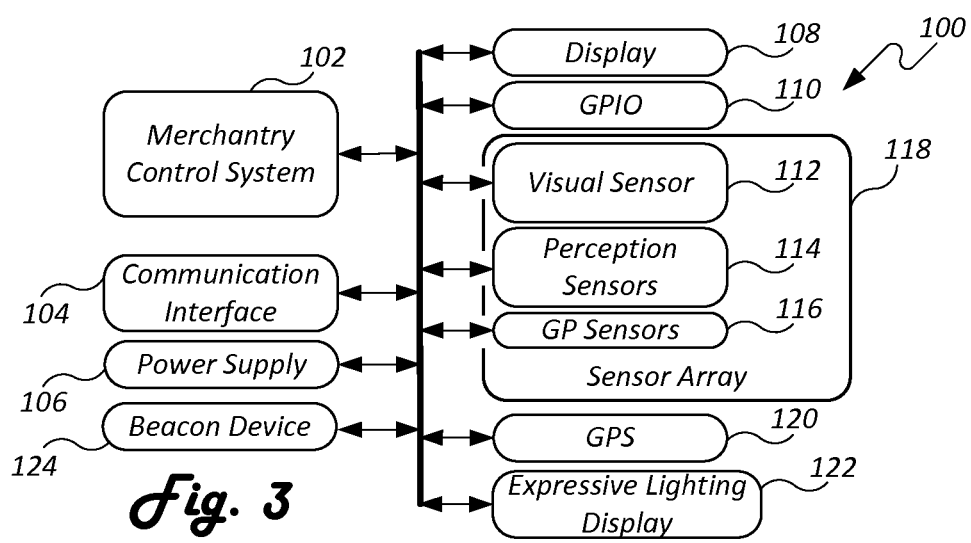
FIG. 3 illustrates one example of a mechanized mobile merchantry control system.

In this regard, in an exemplary embodiment, for example and not a limitation, a mechanized mobile merchantry 100A once deployed, can use perception sensors 116 and in general sensor array 118, better illustrated in at least FIG. 3, to identify a consumer 300B and self-propel to the consumer's location. Furthermore, the mechanized mobile merchantry 100A can socially adapt a persona, as part of a human machine interface, upon approach to the consumer 300B in cases where the mechanized mobile merchantry 100A can determine identity or current activity of the consumer 300A. Such persona, as one example and not a limitation, could be a fitness persona when the consumer is perceived as participating in a fitness activity. Such a fitness persona could include displaying fitness advertising as digital signage on the display 108 or presenting website or other global network based information related a fitness event, club, or activities happening within the geography or of interest nationally (i.e. marathons, golf events, etc.).

In addition to sensor based perception of a consumer 300B and locomotion of the mechanized mobile merchantry 100A to the consumer's 300B location, as the mechanized mobile merchantry 100A approaches the consumer 300B, by way of perception sensor 114 and in general sensor array 118, which is operationally related to the mechanized mobile merchantry 100A, a plurality of facial recognition data associated with a consumer interacting with the mechanized mobile merchantry can be collected. Such a plurality of facial recognition data associated with the consumer 300B can be utilized to identify and data access an account associated with the consumer 300B. Such plurality of facial recognition data of the consumer 300B interacting with the mechanized mobile merchantry 100A can also be stored for future use to enhance the consumer 300B experience and interaction with the mechanized mobile merchantry 100A on the next encounter with the same consumer.

In another exemplary embodiment of autonomous interaction with consumers, for example and not a limitation, a mechanized mobile merchantry 100B can be signaled by a consumer's 300C mobile device 500. In this regard, by way of a consumer 300C using a mobile device 500, the mechanized mobile merchantry 100B can be signaled to self-propel to and interact with the consumer 300C at the consumer 300C location. Optionally, to gain a more precise location of the consumer's 300C location a data communication link between the mobile device 500 and a beacon device 124, the beacon device 124 being operationally related to and positioned on the mechanized mobile merchantry 100B can be established, wherein the beacon device 124 effectuates the ability of the mechanized mobile merchantry 100B to locate and move, self-propelled, to the mobile device 500 location and thus to the consumer 300C precise location.

In another exemplary embodiment, once deployed, a mechanized mobile merchantry 100C can reposition its location proximate groups of consumers 300D for the purpose of collecting recycle refuse. In this regard, as groups of consumer's 300D appear to be idle and temporary located, such as while picnicking or playing sports, in the geography, the mechanized mobile merchantry 100C can determine the need for additional selling of goods or services, or collection of recycle refuse and deploy or otherwise reposition mechanized mobile merchantry 100C to service the consumers 300D. Stated differently, as consumers gather in groups the mechanized mobile merchantry can determine the need and reposition to provide selling and recycle refuse collection for the group, while the group in convened. Once the consumers 300D (group) disperse the mechanized mobile merchantry 100C can be repositioned again. In this regard, wherever consumers 300D gather the mechanized mobile merchantry 100C can gather to service the consumers 300D. When the consumers 300D leave so can the mechanized mobile merchantry 100C to service other parts of the geography.

Referring to FIG. 3 there is illustrated one example of a mechanized mobile merchantry control system. In an exemplary embodiment, a mechanized mobile merchantry control system can operate the devices which operate the mechanized mobile merchantry, serve as a sensor platform for gathering and using sensor data, and effectuate data communications with other mechanized mobile merchantry and/or data communication with the remote data processing resources 602.

The mechanized mobile merchantry control system 100 can comprise a merchantry control system 102, which is a computer or computing platform which can further comprise a microcontroller, such a microcontroller can be low power microcontroller made by TEXAS INSTRUMENTS, INTEL, MICROCHIP, ZILOG, ANALOG DEVICES or other types and/or kinds of microcontrollers, as may be required and/or desired in a particular embodiment. Such a microcontroller can be operationally related to and interconnect with internal memory such as flash memory and other memory for retaining and executing encoded instructions, a communication interface 104, a power supply 106, a beacon device 124, a display 108, a general purpose input/output system (GPIO) 110, a global positioning system (GPS) 120, an expressive lighting display 122, and/or other types and kinds of features and devices, as may be required and/or desired in a particular embodiment.

Furthermore, such a merchantry control system 102 can be operationally related to and interconnect with an array of sensors 118 to collect visual, audio, perception, and/or other types and/or kinds of sensor data, as may be required and/or desired in a particular embodiment. In this regard, such sensor array 118 can include visual sensors 112, perception sensors 114, and other general purpose (GP) sensors 116.

With regards to communication interface 104, such communication interface 104 can be near field communications (NFC), WIFI such as 802.11abgn and/or other types and kinds of WIFI, ZIG BEE type communications, mesh network type communications, wireless carrier interfaces and protocols such as 3G, 4G, LTE, and other types and king of wireless carrier interfaces and protocols, radio frequency identification (RFID) communications, audio encoded data type of communications (speaker to microphone encoded data schemes), universal serial bus (USB), serial communications, Ethernet, or similar used with smartphones including SAMSUNG, HTC, NOKIA, APPLE, and others), infrared or other optical communications, fiber communications, and/or other types and/or kinds of wired and wireless communications and communication protocols, as may be required and/or desired in a particular embodiment.

In another exemplary embodiment, communication interface 104 can also serve as a Wi-Fi hot-spot. In this regard, for example and not a limitation, consumer in proximity to the mechanized mobile merchantry 100 can by way of the communication interface 104 data communicate over the global network. In operation, such service can be unlimited allowing everyone in proximity to the mechanized mobile merchantry to partake in the Wi-Fi access or can be selectively limited to consumers who have purchased a good or service, or placed recycle refuse in one of the merchantry 100, or is a member of a group which is allowed to use the Wi-Fi access, or selectively segmented consumer use of Wi-Fi in some other way, as may be required and/or desired in a particular embodiment.

With regards to power supply 106, such a power supply 106 can be battery, solar, energy harvesting types of power generation, a combination thereof, and/or other types and/or kinds of power supplies, as may be required and/or desired in a particular embodiment.

With regards to beacon device 124, such beacon device 124 can be BLUETOOTH, BLUETOOTH low energy (BLE), ANT+ or other types of BLUETOOTH and/or similar short range wireless communications.

With regards to display 108, such a display 108 can be a liquid crystal display (LCD), light emitting diode (LED), an organic light emitting diode (OLED) combination thereof, or other types and/or kinds of displays, as may be required and or desired in a particular embodiment. Such display 108 can also be touch-sensitive to allow consumers 300 to interact with the display by touch.

In another exemplary embodiment, such a display 108 can be a projection system, wherein from the mechanized mobile merchantry computer screen information such as a game, map, or other types, and/or kinds of screen information can be projected onto a surface for the consumer to interact with. In this regard, for example and not a limitation, a computer game can be projected onto a wall or other surface so that a consumer can play a game while enjoying a refreshing beverage 200.

With regards to expressive lighting display 122, such lighting display 122 can include a series of LED lights or similar organized in a pattern such that illuminating lights, which are arranged in a predefined pattern, to express visually a plurality of emotional states better illustrated in at least FIG. 4 122A-E.

With regards to GPIO 110, such GPIO 110 can be an array of buttons, touch sensitive surfaces, optical and proximity gesture recognition devices, motion detection devices, accelerometers configured as vibration or touch detection, tactile switches and actuators, relays, solenoids, LED, transistors including field effect transistors (FET), (MOSFET), other, silicon controlled rectifiers (SCR) (TRIACS), speakers, microphones, and other types and/or kinds of GPIO, as may be required and/or desired in a particular embodiment.

With regards to global positioning system (GPS) 120, such a GPS 120 can be a device suitable for receiving GPS signals and data from satellites in a manner which can be utilized to geo-locate or to know the geo-location of the mechanized mobile merchantry within the geography. In general, such GPS data can be used by the mechanized mobile merchantry to navigate to precise location and report their location precisely, within a geographical boundary.

With regards to sensor array 118, such sensor array 118 including visual sensor 112, perception sensors 114, and general purpose (GP) sensors 116. Visual sensor 112 can be a camera, infrared, thermal, combinations thereof, or other types and kinds of cameras and/or visual sensors, as may be required and/or desired in a particular embodiment. Perceptions sensors 114 can be a passive infrared sensor (PIR), optical, proximity, capacitive, or other types and/or kinds of perception sensors, as may be required and/or desired in a particular embodiment. General purpose (GP) sensors 116 can include ambient condition sensors such as temperature, light, humidity, environmental, accelerometers such as single axis or multi axis or other types of accelerometers, or other types and/or kinds of sensors, as may be required and/or desired in a particular embodiment.

Figure 4:
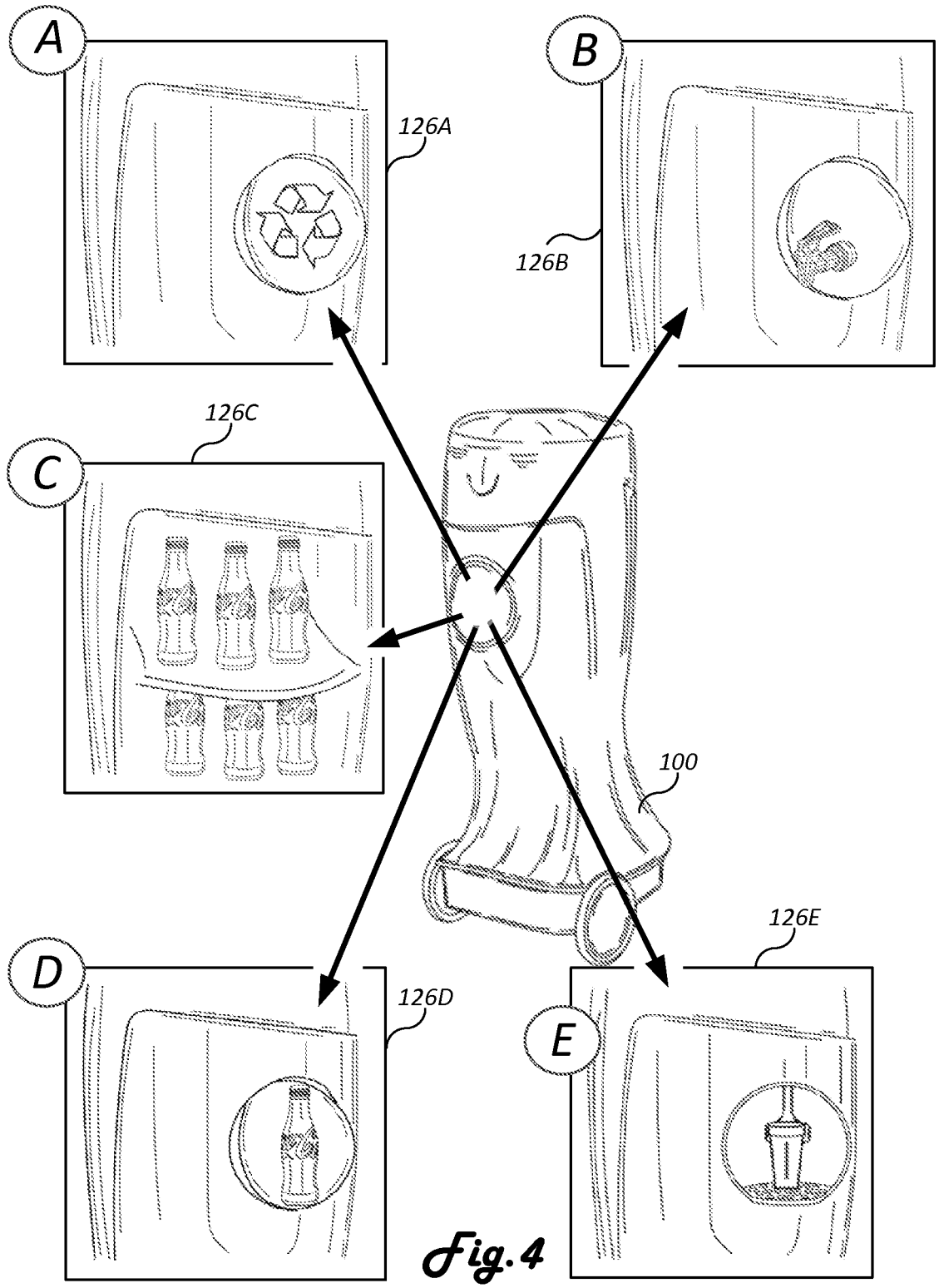
FIG. 4 illustrates examples functional modules which can be interchangeable in a mechanized mobile merchantry.

Referring to FIG. 4 there is illustrated examples functional modules 126A-E which can be interchangeable in a mechanized mobile merchantry 100. In an exemplary embodiment, labeled 'A' in FIG. 5, a functionality module can be removable and interchangeable to configure the mechanized mobile merchantry 100 to sell goods or service, or collect recycle refuse. In this regard, a functional module labeled 'A' in FIG. 5, which is a recycle refuse collection functionality model 126A can be used to collect recycle refuse from a consumer.

Figure 5:
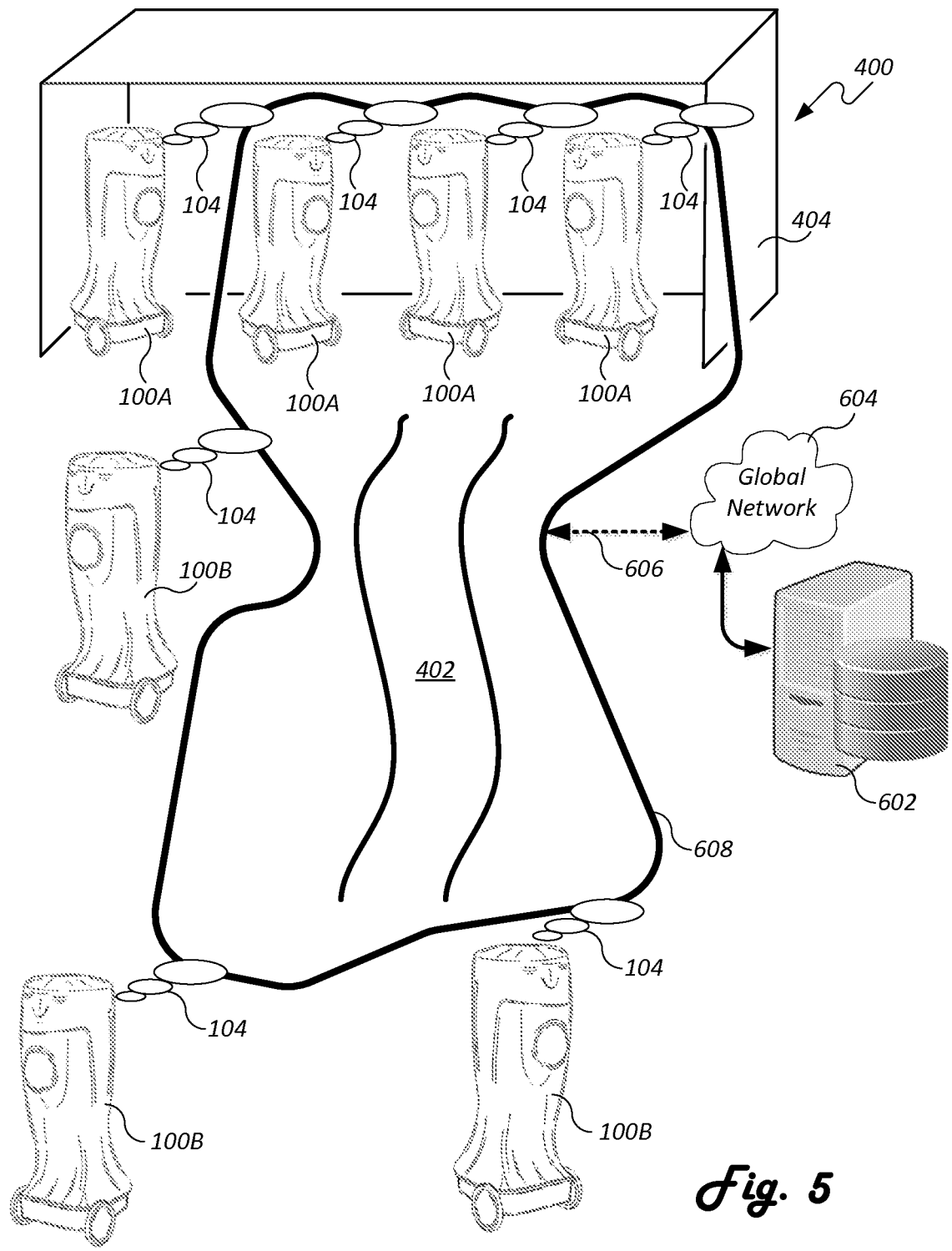
FIG. 5 illustrates one example of a communication network with a plurality of mechanized mobile merchantry, which can optionally connect to and operationally communicate with a remote data processing resource.

In another exemplary embodiment, labeled 'B' in FIG. 5, a bulk water dispenser functional module 126B can be utilized to serve water, such as in a drinking fountain format or sport cooler format, to consumers.

In another exemplary embodiment, labeled 'C' in FIG. 5, a self-serve cooler functional module or a controlled access self-serve cooler functional module, both can be referred to as self-serve cooler functional module 126C can be provided to serve beverage 200 to consumers in an open access or controlled access modes.

In an open access mode of operation, consumers can open the cooler door and retrieve a beverage. In a controlled access mode of operation, the cooler door is electronically locked and consumers must present a mobile payment, cashless payment, or other access ID to electronically unlock the cooler door. Once unlocked the consumer can retrieve a beverage.

In an exemplary embodiment, with cooler modules, a shelf-inventory technology can determine which of the beverages has been removed and charge the consumer accordingly. In addition, shelf inventory technology can be monitored and utilized to determine when the mechanized mobile merchantry 100 needs to be restocked and as such trigger the mechanized mobile merchantry 100 to return to a central location for restocking.

In another exemplary embodiment, labeled 'D' in FIG. 5, a vending functional module 126D can be utilized to vend goods to consumers. Such a vending functional module 126D can be utilized to accept payment from consumers and then vend consumer selected goods and services to the consumer, including beverages 200.

In another exemplary embodiment, labeled 'E' in FIG. 5, a fountain dispenser functional module 126E can be utilized to dispense fountain style beverages where a plurality of concentrates can be blended with a diluent, such as water, on demand, to form a beverage.

In another exemplary embodiment, the functionality module can include social interaction station functionality. In this regard, a consumer 300 can access their FACEBOOK, TWITTER, or other social media type website and communication means including sending and receiving communications, pictures, and other relevant information. Such social interaction station can also include the consumer receiving communications, locating friends within the geography, and other types and/or kinds of social interactions, as may be required and/or desired in a particular embodiment.

In a plurality of exemplary embodiments, such functional modules 126A-E are interchangeable and selectively combinable, as may be required and/or desired in a particular embodiment. Furthermore, other types and/or kinds of functional modules can be utilized, as may be required and/or desired in a particular embodiment.

In another embodiment, a self-serve cooler functional module or a controlled access self-serve cooler functional module pre and post-mixing system. In a post-mixing system each of the beverage supplies can be housed in the self-serve cooler functional module or a controlled access self-serve cooler functional module frame. The beverage supplies can consist of beverage ingredient supplies, CO2 supply, carbonator, and associated pumps and controlling systems. Additionally, the post-mixing system may need a potable drinking water source. The potable drinking water source may be attached or affixed to a municipal water supply.

In a further embodiment, a self-serve cooler functional module or a controlled access self-serve cooler functional module can serve as a hot beverage system that could be implemented into a post-mixing system as described above. The hot beverages could consist of any brew able beverage. For example, coffee, tea, milk and the like.

Referring to FIG. 6 there is illustrated one example of a communication network with a plurality of mechanized mobile merchantry 100, which can optionally connect to and operationally communicate with a remote data processing resource. In an exemplary embodiment, a plurality of mechanized mobile merchantry 100A and 100B can wirelessly data communicate 608 with each other by way of a communication interface 104 which is operationally related to and associated with the merchantry control system 102. Such data communication can include USED BY CONSUMER LOGS and HUMAN TRAFFIC PATTERN LOGS.

Such logs can be utilized by algorithms, such as a MERCHANTRY OPTIMIZATION ALGORITHM, and other algorithms to determine the functional module mix or allocation of the fleet or plurality of mechanized mobile merchantry, and the location to position each of the mechanized mobile merchantry within a geographically boundary 400.

In an exemplary embodiment, in one mode of operation the plurality of mechanized mobile merchantry 100A (100A being parked out-of-service in central location), 100B (100B being deployed for consumer interaction) can data communicate with each other and self-learn, optimizing geographical location to increase human traffic locomotion past the mechanized mobile merchantry in an attempt to increase sales, meet consumer recycle refuse needs, or a combination thereof. In addition, the plurality of mechanized mobile merchantry 100A, 100B can self-learn and determine the modular functionality type associated with each of the mechanized mobile merchantry 100A, 100B. Such self-learning can include determining mix and number mechanized mobile merchantry modular functionality including modular functionality of vending, self-serve cooler, controlled access self-serve cooler, fountain dispenser, bulk water dispenser, pet treat dispenser, recycle refuse receptacles, social media interaction station, digital signage, or combinations thereof.

Furthermore, in an exemplary embodiment, the plurality of mechanized mobile merchantry 100A, 100B can self-learn and determine how many of the mechanized mobile merchantry 100B should be deployed within the geographical boundary 400, and how many of the mechanized mobile merchantry 100A should remain in a central location 404, away for consumers, out of service, perhaps recharging in preparation of future use. In this regard, as the volume of consumer interactions change, within the geographical boundary 400, the number of deployed mechanized mobile merchantry 100B can be changed with certain merchantry 100B returning for out-Oof-service central location restock, recharge, and storage, and selectively other merchantry 100A being deployed for consumer interaction, as may be required and/or desired in a particular embodiment.

In another mode of operation, in lieu of total autonomous decision making and self-learning between the mechanized mobile merchantry 100A, 100B by wireless data communication 608, a remote data processing resource 602, by way of a global network 604, such as the Internet, can data communicate 606 with and selective control the fleet of or plurality of mechanized mobile merchantry 100A, 100B. In this mode of operation, the remote data processing resource 602 can collect the USED BY CONSUMER LOGS and HUMAN TRAFFIC PATTERN LOGS from each of the mechanized mobile merchantry 100A, 100B and utilize algorithms, such as a MERCHANTRY OPTIMIZATION ALGORITHM to determine designated geographical locations for at least some of the mechanized mobile merchantry 100B, determine optimized modular functionality mix, number, and need to serve the community of consumers, and/or other make other determinations, as may be required and/or desired in a particular embodiment.

Figure 7:
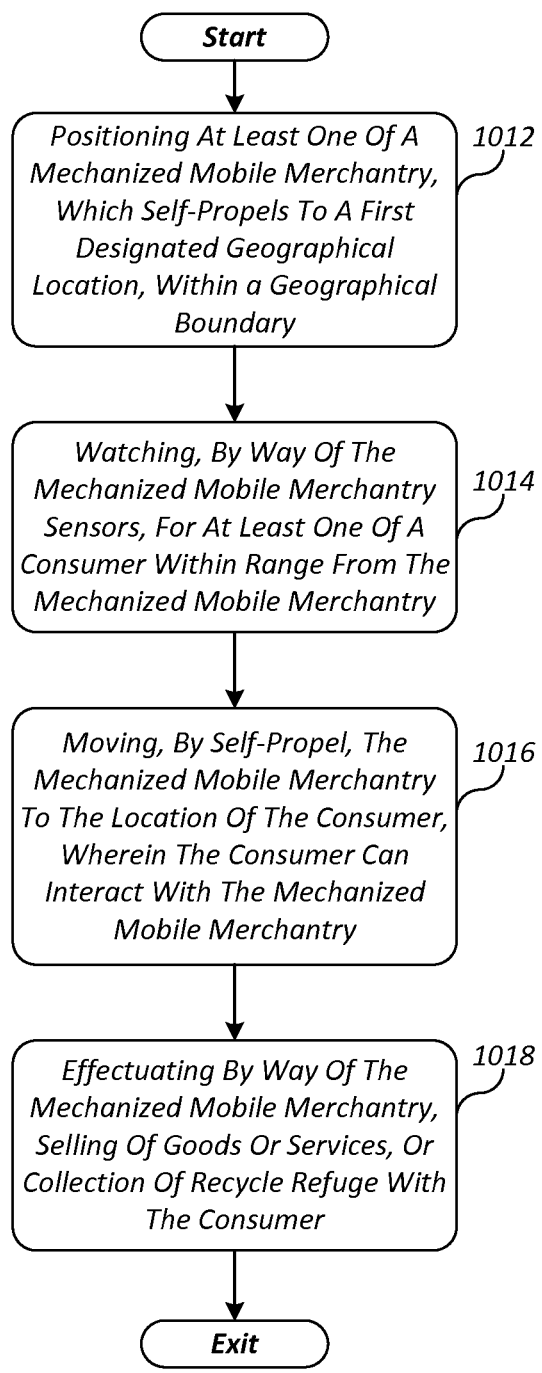

Referring to FIG. 7 there is illustrated methods of selling goods or services, or collecting recycle refuse using mechanized mobile merchantry 100. In an exemplary embodiment, a mechanized mobile merchantry 100 can be positioned at a first designated geographical location, within a geographical boundary. The mechanized mobile merchantry 100 then watches, by way of sensors, for at least one of a consumer 300 in range. Having identified a consumer, the mechanized mobile merchantry 100 then moves, by self-propelling, to the location of the consumer, illuminate expressive lighting to convey emotion to the consumer, and proceed to transact or otherwise effectuate the selling of goods or services, or collection of recycle refuse with the consumer. The method begins in block 1002.

In block 1002 at least one of a mechanical mobile merchantry 100 can be positioned, by self-propelling, at a first designated geographical location, within a geographical boundary. The method moves to block 1004.

In block 1004 the mechanized mobile merchantry 100 utilizing sensor array 118 can monitor the surrounding area around the mechanized mobile merchantry 100, watching for a consumer 300 within range. Such range can be in the range of feet to one hundred or more yards. The method moves to block 1006.

In block 1006, by self-propelling, the mechanized mobile merchantry 100 moves to the location of the consumer 300 so that the consumer 300 can interact with the mechanized mobile merchantry 100. The method moves to block 1008.

In block 1008 lights, referred to as the expressive lighting display 122, which are arranged in a predetermined pattern to express visually a plurality of emotional states can be illuminated on the mechanized mobile merchantry 100. In an exemplary embodiment, the mechanized mobile merchantry 100 can express emotions such as playful, happy smile, or a curiosity grin, or other lighted emotions by illuminating, brightening, dimming, extinguishing, and creating lighted motion patterns, by way of the expressive lighting display 122, on the face of the mechanized mobile merchantry. The method moves to block 1010.

In block 1010 the mechanized mobile merchantry 100 can effectuate the selling of goods or services, or collect recycle refuse with the consumer 300. The method is then exited.

Figure 8:
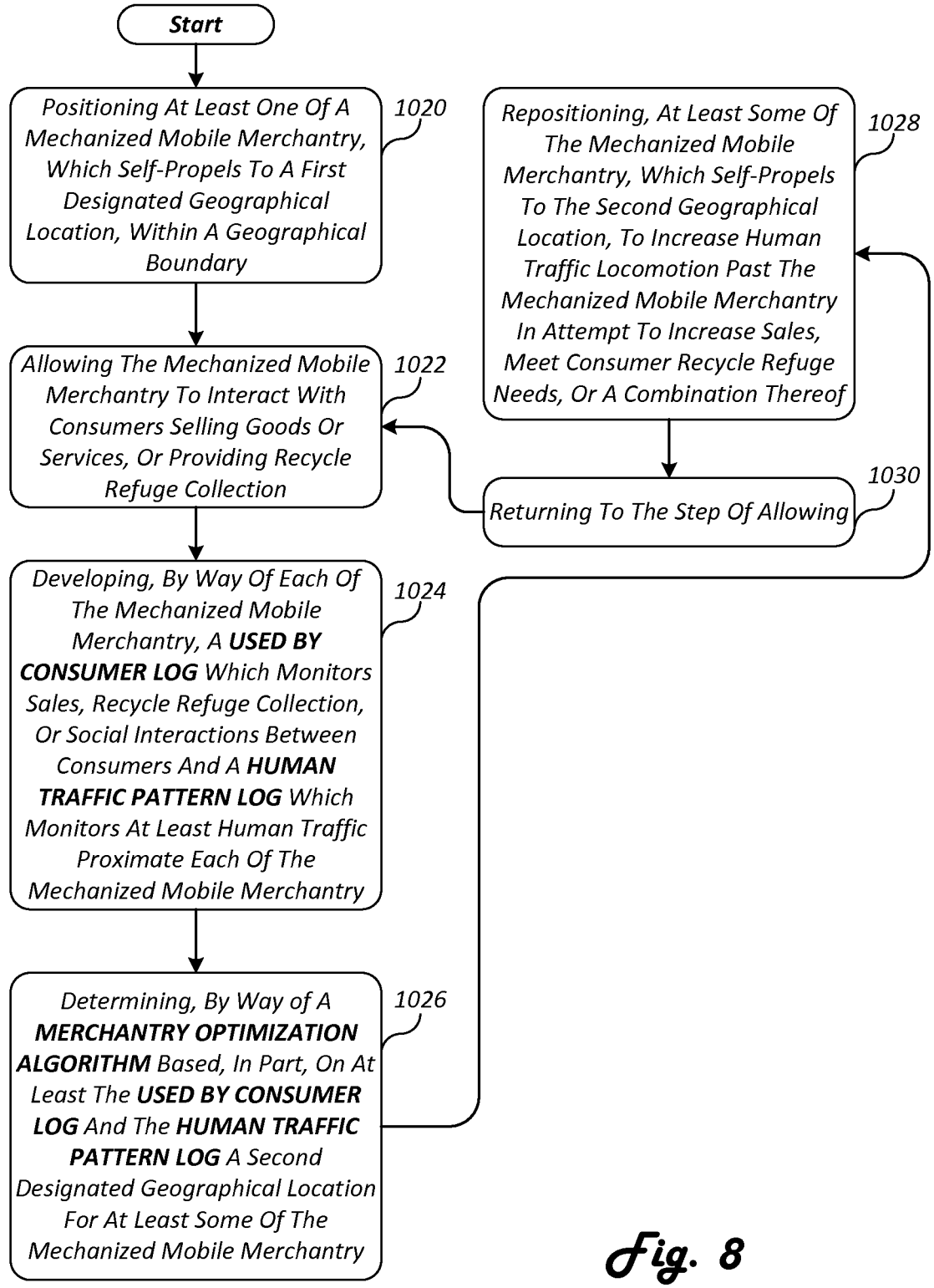

Referring to FIG. 8 there is illustrated methods of selling goods or services, or collecting recycle refuse using mechanized mobile merchantry 100. In an exemplary embodiment, a mechanized mobile merchantry 100 can be positioned at a first designated geographical location, within a geographical boundary. The mechanized mobile merchantry 100 then watches by way of sensor for at least one of a consumer 300 in range. Having identified a consumer, the mechanized mobile merchantry 100 then moves, by self-propelling, to the location of the consumer 300 where selling of goods or services, or collection of recycle refuse can be effectuated with the consumer 300. The method begins in block 1012.

In block 1012 at least one of a mechanical mobile merchantry 100 can be positioned, by self-propelling, at a first designated geographical location, within a geographical boundary. The method moves to block 1014.

In block 1014 the mechanized mobile merchantry 100 utilizing sensor array 118 can monitor the surrounding area, the mechanized mobile merchantry 100 watching for a consumer 300 to come within range. Such range can be in the range of feet to one hundred or more yards. The method moves to block 1016.

In block 1016, by self-propelling, the mechanized mobile merchantry 100 moves to the location of the consumer 300 so that the consumer 300 can interact with the mechanized mobile merchantry 100. The method moves to block 1018.

In block 1018 the mechanized mobile merchantry 100 can effectuate the selling of goods or services, or collect recycle refuse with consumer. The method is then exited.

Figures 9, 10:
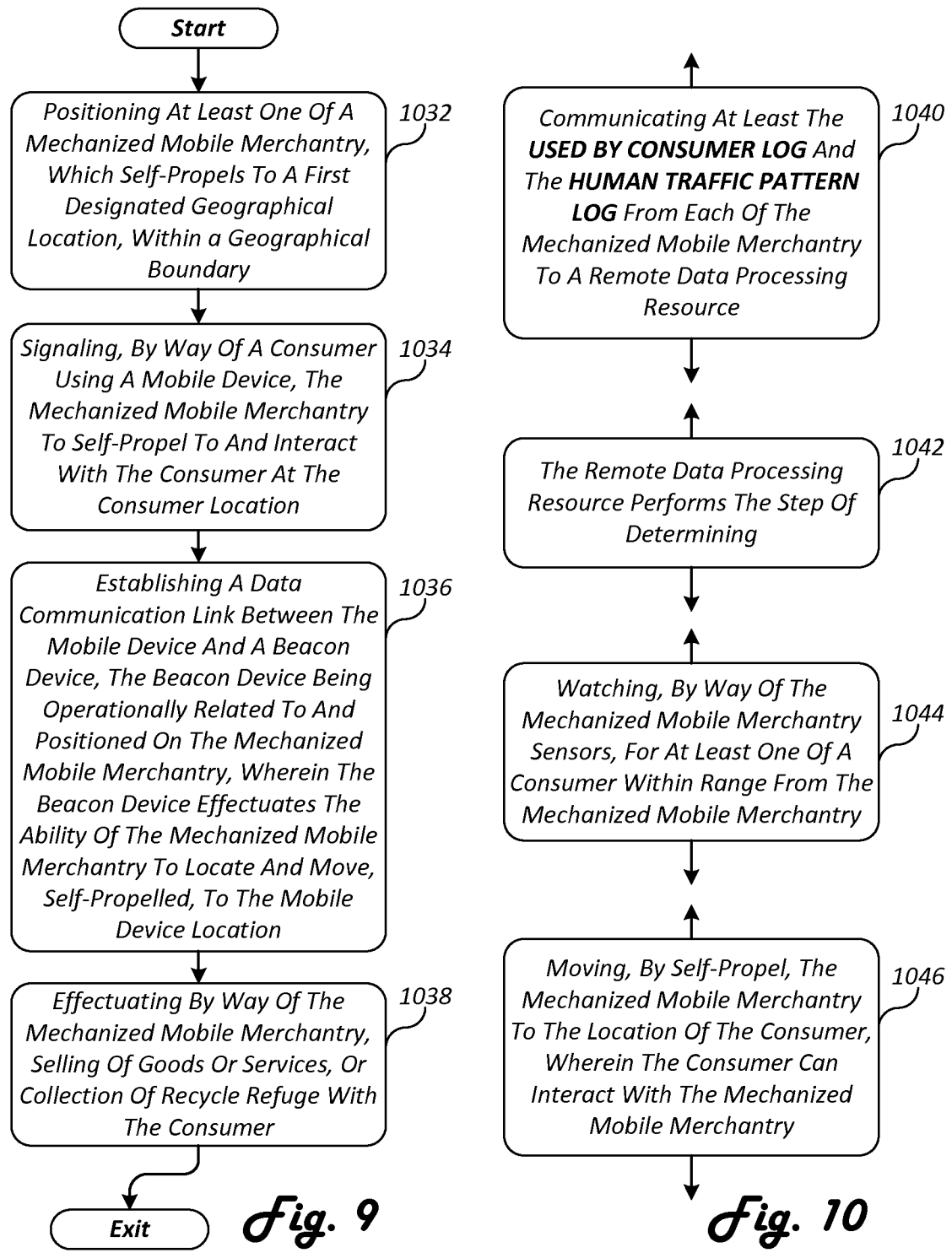

Referring to FIG. 9 there is illustrated methods of selling goods or services, or collecting recycle refuse using mechanized mobile merchantry 100. In an exemplary embodiment, a mechanized mobile merchantry 100 can be positioned at a first designated geographical location, within a geographical boundary. The mechanized mobile merchantry 100 can then interact with consumers selling goods or services, or providing recycle refuse collection. Each of the mechanized mobile merchantry 100 can develop a USED BY CONSUMER LOG which monitors and tracks sales, recycle refuse collection, or social interaction with the consumers. In addition, a HUMAN TRAFFIC PATTERN LOG monitors at least the human traffic proximate each of the mechanized mobile merchantry 100. A MERCHANTRY OPTIMIZATION ALGORITHM can then determine based, in part, on at least the USED BY CONSUMER LOG and the HUMAN TRAFFIC PATTERN LOG a second designated geographical location for at least some of the mechanized mobile merchantry 100. At least some of the mechanized mobile merchantry 100 can be repositioned to the second geographical location to increase human traffic locomotion past the mechanized mobile merchantry 100 in an attempt to increase sales, and meet consumer 300 recycle refuse needs, or a combination thereof. The method begins in block 1020.

In block 1020 at least one of a mechanical mobile merchantry 100 can be positioned, by self-propelling, at a first designated geographical location, within a geographical boundary. The method moves to block 1022.

In block 1022 the mechanized mobile merchantry 100 can be allowed to interact with consumers selling goods or services, or providing recycle refuse collection. The method moves to block 1024.

In block 1024 by way of each of the mechanized mobile merchantry 100, a USED BY CONSUMER LOG, which monitors and tracks sales, recycle refuse collection, or social interactions between the consumer 300 and the mechanized mobile merchantry 100, and a HUMAN TRAFFIC PATTERN LOG, which monitors at least human traffic proximate each of the mechanized mobile merchantry 100 can be determined. The method moves to block 1026.

In block 1026, by way of a MERCHANTRY OPTIMIZATION ALGORITHM based, in part, on at least the USED BY CONSUMER LOG and the HUMAN TRAFFIC PATTERN LOG a second designated geographical location for at least some of the mechanized mobile merchantry 100 is determined. The method moves to block 1028.

In block 1028 at least some of the mechanized mobile merchantry 100 are repositioned, self-propelling, to the second geographical location, to increase human traffic locomotion past the mechanized mobile merchantry 100 in an attempt to increase sales, and meet consumer 300 recycle refuse needs, or a combination thereof. The method moves to block 1030.

In block 1030 the method returns to the step of allowing in block 1022.

Referring to FIG. 10 there is illustrated methods of selling goods or services, or collecting recycle refuse using mechanized mobile merchantry 100. In an exemplary embodiment, a mechanized mobile merchantry 100 can be positioned at a first designated geographical location, within a geographical boundary. A consumer 300 in possession of a mobile device 500 can use their mobile device 500 to signal the mechanized mobile merchantry 100 causing the mechanized mobile merchantry 100 to self-propel towards the consumer's location. To locate the consumer 300 precise location, a data link can be established between the mobile device 500 and a beacon device 124, the beacon device 124 being operationally related to and positioned on the mechanized mobile merchantry 100, wherein the beacon device 124 effectuates the ability of the mechanized mobile merchantry 100 to locate and move, self-propelled, to the mobile device 500 and therefore to the consumer's precise location. The method begins in block 1032.

In block 1032 at least one of a mechanical mobile merchantry 100 can be positioned at a first designated geographical location, within a geographical boundary. The method moves to block 1034.

In block 1034 a consumer 300 by way of the consumer's mobile device 500 can signal a mechanized mobile merchantry 100 to self-propel to the consumer's location. The method moves to block 1036.

In block 1036 to better guide the mechanized mobile merchantry 100 to the precise consumer location, in possession of the mobile device 500, a data link can be established between the mobile device 500 and a beacon device 124. The beacon device 124 being operationally related to and positioned on the mechanical mobile merchantry 100, wherein the beacon device 124 effectuates the ability of the mechanized mobile merchantry 100 to locate and move, self-propelled, to the mobile device 500 location. The method moves to block 1038.

In block 1038 the mechanized mobile merchantry 100 can effectuate the selling of goods or services, or collect recycle refuse with consumer. The method is then exited.

Figure 11:
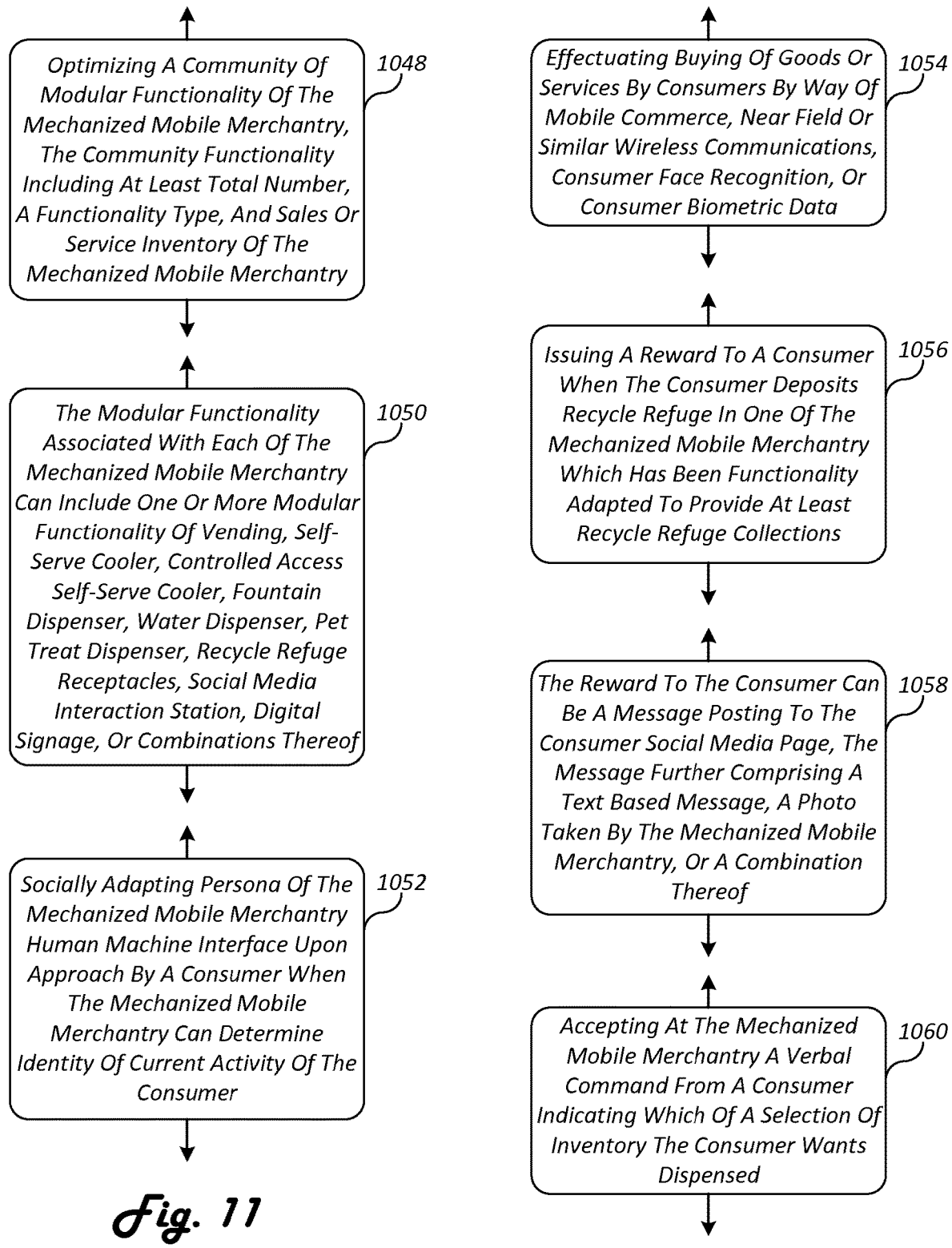

Referring to FIG. 11 there is illustrated methods of selling goods or services, or collecting recycle refuse using mechanized mobile merchantry 100. Such exemplary embodiments illustrated below can be selectively utilized with the methods of the present invention.

In block 1040 at least the USED BY CONSUMER LOG and the HUMAN TRAFFIC PATTERN LOG are communicated from each of the mechanized mobile merchantry 100 to a remote data process resource 602.

In block 1042 the remote data processing resource 602 performs the step of determining.

In block 1044 the mechanized mobile merchantry 100 watches by way of the sensor array 118 for at least one of a consumer 300 to be within range of the mechanized mobile merchantry 100. Such range can be in the range of feet to one hundred or more yards.

In block 1046 the mechanized mobile merchantry 100, by way of self-propelling, moves to the location of the consumer 300, wherein the consumer 300 can interact with the mechanized mobile merchantry 100.

Figure 12:
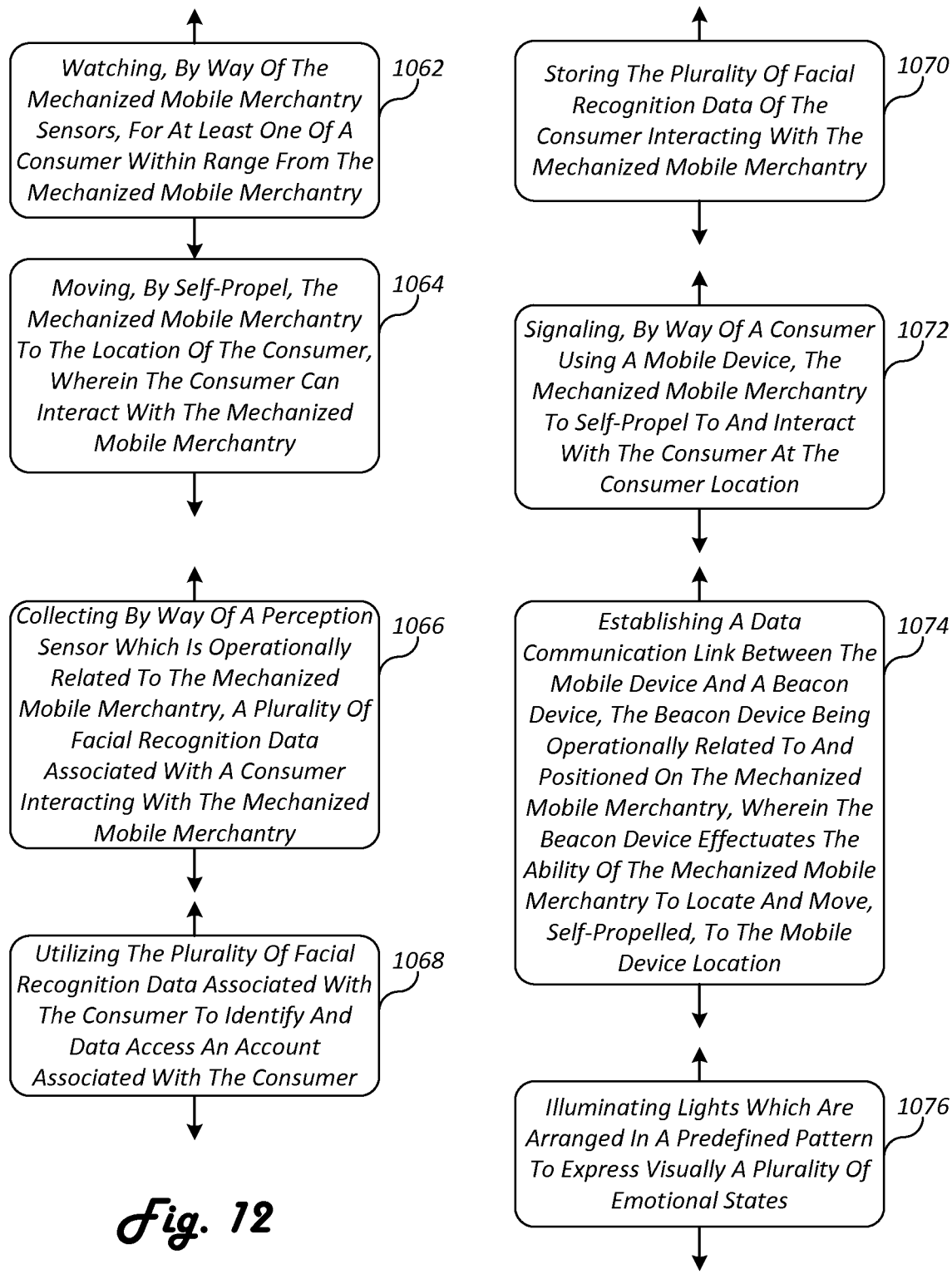

Referring to FIG. 12 there is illustrated methods of selling goods or services, or collecting recycle refuse using mechanized mobile merchantry 100. Such exemplary embodiments illustrated below can be selectively utilized with the methods of the present invention.

In block 1048 a community of functionality modules of the mechanized mobile merchantry 100 can be optimized through a variety of interchangeable functional modules 126A-E better illustrates these interchangeable functional modules in at least FIG. 5. In an exemplary embodiment, analysis of at least the total number of mechanized mobile merchantry 100, the community of modular functionality type of mechanized mobile merchantry 100, and the sales or service inventory of the community of mechanized mobile merchantry 100 can be used to optimize the distribution and mix of functionality modules of the community of mechanized mobile merchantry 100 to better serve the needs of consumers.

In block 1050 the functionality modules associated with each of the mechanized mobile merchantry 100 can include one or more functionality modules which can include, with reference to FIG. 5, vending module 126D, self-serve cooler 126C, controller access self-serve cooler 126C, fountain dispenser 126E, bulk water dispenser 126B, pet treat dispenser, recycle refuse receptacles 126A, social media interaction station, digital signage, or combinations thereof.

In an exemplary embodiment, a vending functionality module 126D of FIG. 4 can be configured to dispense a pet treat or dispense other items, as may be required and or desired in a particular embodiment. In addition, such a social media interaction station and digital signage can be effectuated by way of at least the merchantry 100 control system 102 and display 108.

In an exemplary embodiment a social media interaction stations is effectuated when a consumer approaches the mechanized mobile merchantry 100 and accesses a social media website or program through interacting with the mechanized mobile merchantry 100, display 108. In this regard, is the consumer is part of a running group, for example and not a limitation, the mechanized mobile merchantry 100 can access the running group's social media website and the consumer can interact in a social media manner with the group and group's online presence. Such interaction can be locating other runners proximate the location of the consumer, checking the consumer's own personal exercise metrics, or other types and/or kinds of consumer or community information, as may be required and/or desired in a particular embodiment.

In another exemplary embodiment, the mechanized mobile merchantry 100 can effectuate digital signage. Such digital signage can be route directions for a running or exercise group, informational in nature to the general population of consumers, and/or advertisements of sponsors and/or other, as may be required and or desired in a particular embodiment. Such digital signage can be configured to be viewable at a distance so that consumer passing by the mechanized mobile merchantry can see the digital signage without having to interact with the mechanized mobile merchantry.

In block 1052 the mechanized mobile merchantry 100 can adapt is persona socially reconfiguring the human machine attributes upon approach by a consumer when the mechanized mobile merchantry 100 can determine the identity of or current activity of the consumer.

In block 1054 buying of goods or services by consumers, can be effectuated, by way of, mobile commerce, mobile payment, cashless payment, near field communications, consumer biometric data, or other type and/or kinds of wireless communications, as may be required and/or desired in a particular embodiment.

In block 1056 a reward to a consumer can be issued when the consumer 300 deposits recycle refuse in one of the mechanized mobile merchantry 100, which has been functionality adapted to provide at least recycle refuse collections.

In block 1058 the reward to the consumer can be a message posting to the consumer's social media page. The message can further comprise a text based message, a photograph taken by or with the mechanized mobile merchantry 100, or a combination thereof.

In block 1060 the mechanized mobile merchantry 100 can accept a verbal command from a consumer 300 indicating which of a selection from an inventory the consumer wants dispensed.

Figure 13:
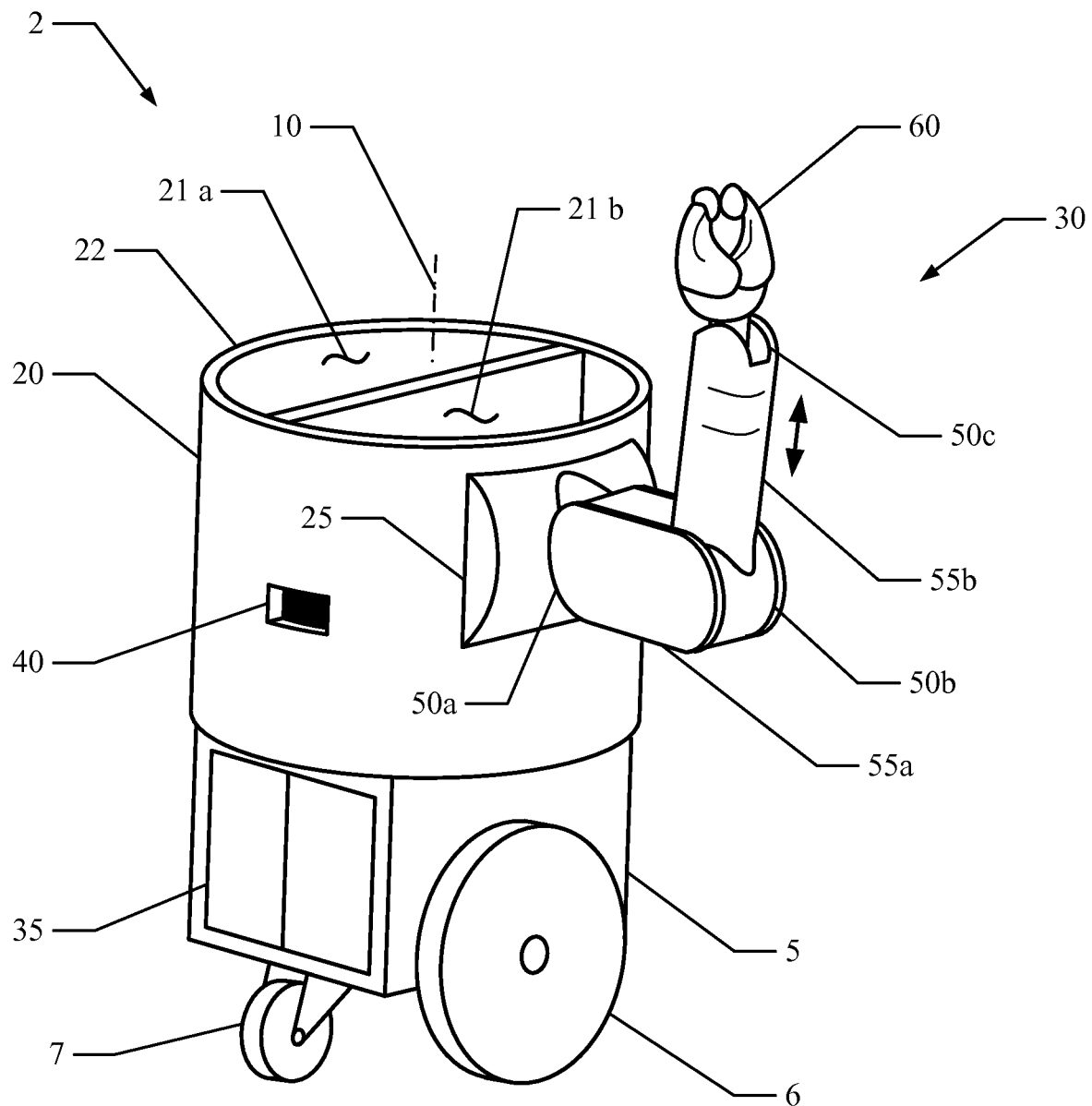
FIG. 13 depicts a perspective view of an exemplary service robot having an articulated arm.

Referring to FIG. 13 there is illustrated methods of selling goods or services, or collecting recycle refuse using mechanized mobile merchantry 100. Such exemplary embodiments illustrated below can be selectively utilized with the methods of the present invention.

In block 1062 the mechanized mobile merchantry, by way of sensor array 118, can watch for at least one of a consumer within range from the mechanized mobile merchantry. Such range can be in the range of feet to one hundred or more yards. The method moves to block 1064.

In block 1064 the mechanized mobile merchantry. By way of self-propelling, moves to the location of the consumer 300, wherein the consumer can interact with the mechanized mobile merchantry 100.

In block 1066 the mechanized mobile merchantry 100 can collect, by way of a perception sensor 114, which can be a camera or other perception sensor, a plurality of facial recognition data associated with a consumer 300 interacting with the mechanized mobile merchantry 100.

In block 1068 the plurality of facial recognition data associated with the consumer 300 can be utilized to identify and data access an account associated with the consumer 300.

In block 1070 the plurality of facial recognition data of the consumer 300 interacting with the mechanized mobile merchantry 100 can be stored for future reference.

In block 1072 by way of a consumer using a mobile device, the mechanized mobile merchantry 100 can be signaled to self-propel to and interact with the consumer 300 at the consumer's location.

In block 1074 a data link can be established between the mobile device 500 and a beacon device 124. The beacon device 124 can be operationally related to and positioned on the mechanized mobile merchantry 100, wherein the beacon device 124 effectuates the ability of the mechanized mobile merchantry 100 to locate and move, by self-propelling, to the mobile device 500 location, thus proximate the consumer in possession of the mobile device 500.

In block 1076 lights, referred to as the expressive lighting display 122, which are arranged in a predetermined pattern to express visually a plurality of emotional states can be illuminated on the mechanized mobile merchantry 100. In an exemplary embodiment, the mechanized mobile merchantry 100 can express emotions such as playful, happy smile, or a curiosity grin, or other lighted emotions by illuminating, brightening, dimming, extinguishing, and creating lighted motion patterns, by way of the expressive lighting display 122, on the face of the mechanized mobile merchantry.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

Figure 15:
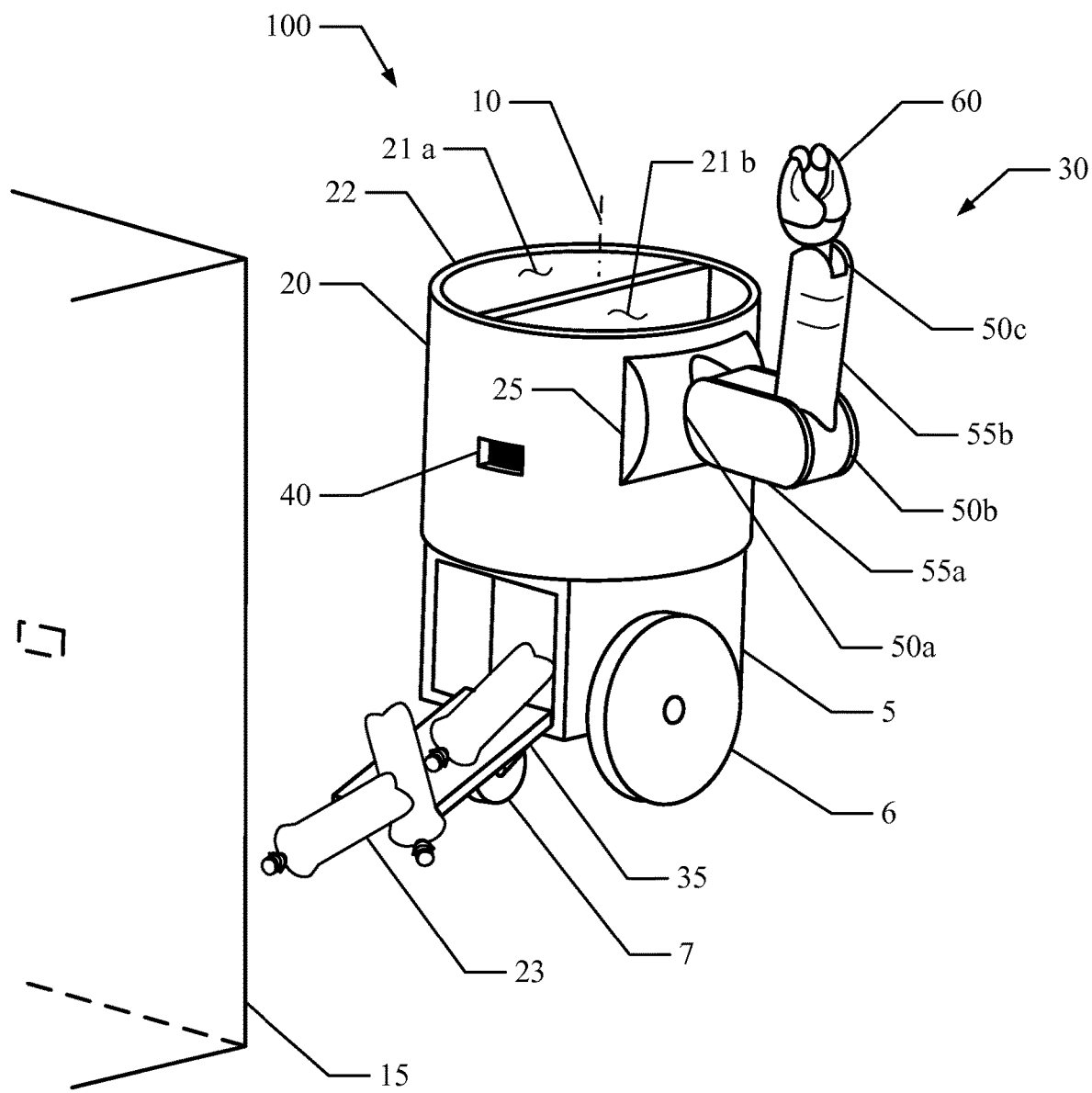
FIG. 15 depicts a perspective view of an exemplary service robot including dispensed waste articles and a recycling unit.

In FIG. 13 a robot 100 is shown having a wheeled base 5 capable of turning about a central axis 10 of the robot 100. A main body 20 is generally round in shape to facilitate turning with minimal opportunity for interference with other objects such as table(s) 56 (shown in FIG. 2), chairs, or humans. The main body 20 includes one or more waste receptacle(s) 21 for receiving waste article(s) 23, shown having an open top 22. Two waste receptacles (21a and 21b) are shown in FIG. 15, but more may be included. The main body 20 may also include a lid (not shown) for covering the open top 22 for long transports, to seal odors, or to provide a more pleasant experience for humans which may deem exposed waste articles 23 objectionable. The main body 20 includes waste removal aperture(s) 35 corresponding to less than or equal to the number of waste receptacle(s) 21.

An exemplary power/communication connection is provided by an electrical socket 40, shown on an exterior surface of the main body 20. This provides power for charging a battery 41 (illustrated in FIG. 16) residing on the robot 100, and for providing communication to a master computer 42 (illustrated in FIG. 16). The master computer 42 (illustrated in FIG. 18) provides command control of the robot 100, communicating instructions and information with a slave computer 43 (illustrated in FIG. 18) on-board the robot 100 for controlling tasks to be performed, regions to be serviced, and how waste article(s) 23 are sensed and are to be sorted in the one or more waste receptacle(s) 21. The electrical socket 40 may be positioned on any accessible surface of the robot 100, but is preferably positioned in essentially vertical alignment with a waste removal aperture 35. An alternate connectivity scheme between the master computer 42 and slave computer 43 may rely on any common connectivity method. For example, wireless connectivity may be used and may have certain advantages to provide bi-directional communication in real time.

A shoulder 25 protrudes from the main body 20 from which an articulating arm 30 is connected. The articulating arm 30 is capable of articulation, having one or more joint(s) 50 that are each capable of rotation, connected by link(s) 55. The articulating arm 30 shown in FIG. 15 includes three (3) joints (50a, 50b, 50c) and two (2) links (55a and 55b). A hand 60 is connected to the end of the articulating arm 30, capable of clamping. It is also preferable that at least one link (such as 55b) is capable of axial extension and contraction to facilitate reaching over a distance from the main body 20 of the robot, such as to a table 56 (FIG. 16). The articulating arm 30 includes a hand 60 capable of grasping various shaped objects such as plates, cups, bottles and other items common in a serving environment. The articulated arm 30 shown in FIG. 1 has a minimum of four (4) degrees of motion (three (3) from joints 50a, 50b 50c, and one from axial extension of link 55b). It is preferred, however, that at least joints 50a and 50c have two rotational degrees of motion, thereby resulting in a total of six (6) degrees of motion. A minimum number for practical articulation requirements is three (3) degrees of motion.

Alternative devices for waste article 23 retrieval may be a conveyor such as a conveyor belt (not shown), a paddle (not shown), a sweeper (not shown), a scoop (not shown), or any like device. These alternatives are less capable of sorting at the point of waste article 23 collection.

The robot is driven by at least two (2) drive wheels 6 preferably having independently controlled drive motors capable of forward and reverse rotation, normally described as a two-wheeled omnidirectional drive system. A caster wheel 7 provides a third point of ground contact for stability. A typical caster wheel 7 is a passive wheel capable of 360 degrees rotation. In operation, the robot 100 will traverse a straight line (forward or backward) by both drive wheels 6 moving in the same direction at the same speed. The robot 100 will traverse a curve by having a first wheel 6 moving in a direction at a speed, while the second wheel 6 is moving in the same direction but at a slightly different speed. The robot 100 will not traverse, but rotate about the central axis 10, by a first wheel 6 rotating in one direction at a speed, and a second wheel 6 rotating in a second direction at the same speed. Various other drive systems may be used according to the present invention.

Waste receptacle(s) 21 may optionally include a shredding, grinding or compacting means to improve the waste carrying capacity of the robot 100.

Figure 14:
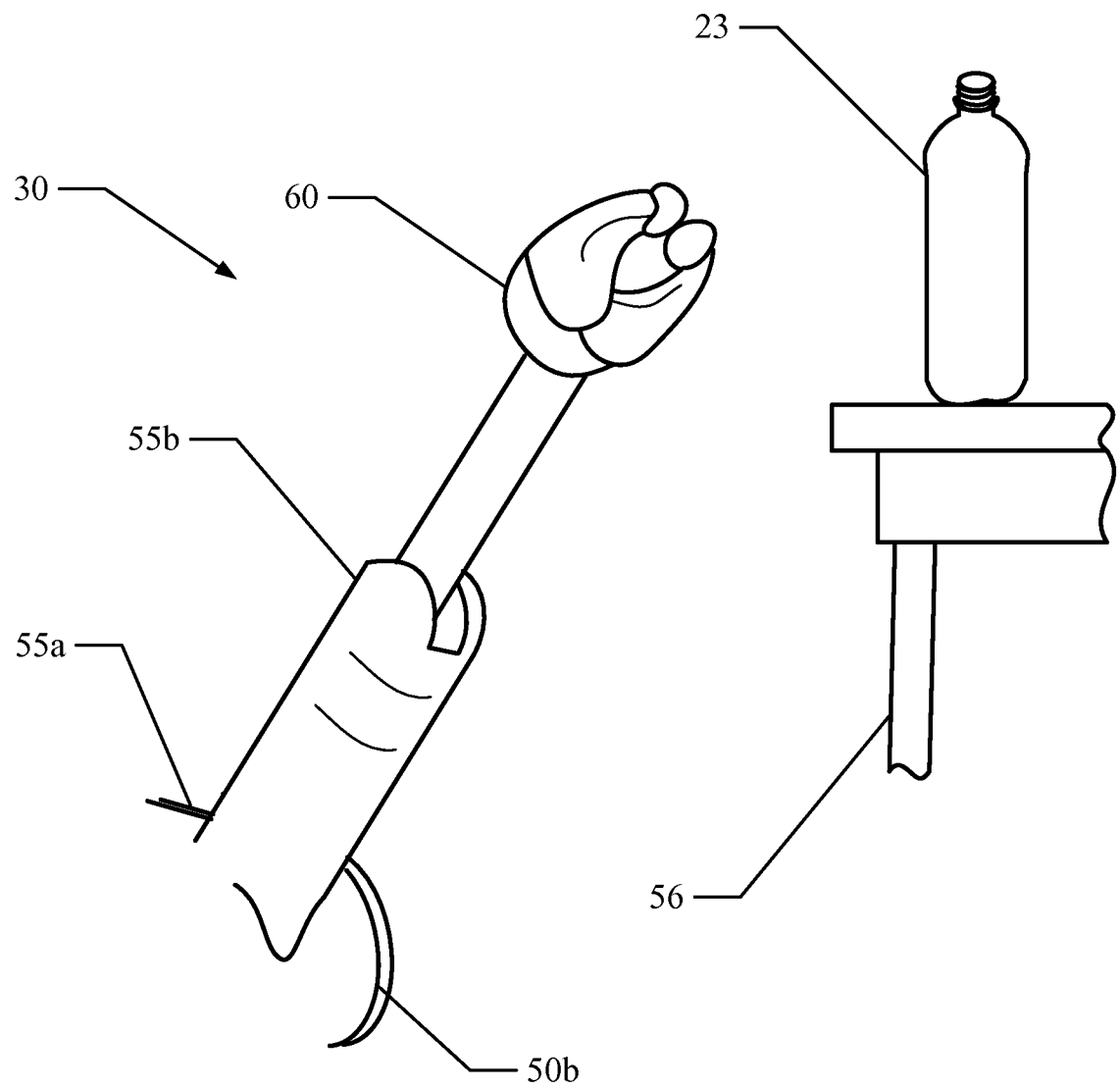
FIG. 14 depicts a perspective view of an exemplary articulated arm including a waste article.

FIG. 14 shows an articulating arm 30 in use, during retrieval of a waste article 23 resting on a table 56 (partially shown). Link 55b is shown extended axially to reach for the waste article 23 shown. Hand 60 is shown rotated in preparation to retrieve waste article 23.

FIG. 15 shows the robot 100 in proximity to a recycling unit 15. Recycling unit 15 is capable of containing a power supply 36 for supplying power to one or more robot(s) 100 (FIG. 4) and master computer 42. These devices may also be located separately from the recycling unit 15. The power supply 36 is provided to maintain the battery 41 for providing electrical power to the robot 100 (FIG. 4). The master computer 42 provides communication to the slave computer 43. In a preferred embodiment, recycling unit 15 is the primary interface to one or more robot(s) 100 supplying waste article(s) 23. Recycling unit 15 may be configured to include an equal or greater number of waste bins (not shown), capable of receiving waste articles 23 which may have been at least partially sorted by one or more robot(s) 100. Recycling unit 15 includes sensors such as optical and weight sensors to improve functions to sort recyclable waste from disposable waste, and to sort recyclable waste by type into separate waste portions, via bins, segmented containers or other partitioning means. Robot 100 may interface with the recycling unit 15 by a receiving means, which may be one or more conveying systems, such as those using belts or tracks (not shown), scraper systems, such as those using linear or rotary scrapers (not shown), air transfer systems such as those embodying a vacuum or suction device (not shown), paddle systems, such as those using polymer, wooden or metallic paddles (not shown) or other common material handling device that is capable of receiving at least partially sorted waste articles 23 from robot 100.

Robot 100 includes a waste removal aperture 35, such as a door shown in an open state to release waste articles 23 collected by the robot 100. The waste removal aperture 35 will open on command when the robot 100 is in proximity of the recycling unit 15. It is preferred that there be one waste removal aperture 35 for each waste receptacle 21. Alternately, the waste receptacle 21 may rotate within the main body 20 to align an opening (not shown) with a waste removal aperture 35. The waste removal aperture may be hingedly covered as shown, or may be slidably covered.

In operation, a covered waste removal aperture 35 will open on command, and the robot 100 will interface with recycling unit 15, dispensing waste via a dispensing means such as a gravity feed, conveyance or ejection mechanism, or with assistance from one or more articulating arm(s) 30 into proximity of the recycling unit 15. Waste articles(s) 23 will preferably be dispensed within access of a receiving means. Dispensing may be assisted by active or passive features in the robot or recycling unit. The receiving means will transfer the waste articles 23 into recycling unit 15, wherein confirmation of sorting, or additional sorting occurs. Once fully sorted, waste articles 23 capable of recycling may be compressed, or will pass directly to a storage facility available for transport. Waste articles not intended for recycling will be separately stored, or will be transferred to a trash container (not shown).

While positioned in proximity to the recycling unit 15, robot 100 may also be positioned to engage the electrical socket 40. By so doing, battery 41 may receive charge, and/or communication instructions may be provided to the slave computer 43. Although shown as a single feature, electrical socket 40 may be separated to provide power separately from communication.

In another exemplary embodiment the robot 100 can be configured to delivery for or beverage consummate with the removal of consumed food or beverage packaging and containers. In this regard, the robot 100 can provide new ready for consumption food and beverage products and at the same time remove the packaging and containers of previously consumer food and beverage for recycling.

FIG. 16 is a schematic of the electrical and control system for one or more robot(s) 100, and a recycling unit 15. In FIG. 18, the recycling unit 15 is illustrated by orthogonal lines having components on one side. There are two (2) robots 100 represented by partial circles. The recycling unit 15 is connected to the two (2) robots 100 by electrical socket 40. Although only two (2) robots 100 are shown in this illustration, any reasonable number of robots 100 may be connected to the recycling unit 15 in the manner shown here.

In FIG. 16, power supply 36 and master computer 42 are shown as part of recycling unit 15. Each of these is connected to the two (2) robots 100 shown via electrical socket 40. Within each robot 100, there is a battery 41, which receives power from power supply 36. Also within each robot 100 is a slave computer 43, a drive system 44, and a sensor array 45.

The exemplary drive system 44, corresponding to the wheeled base 5 shown in FIGS. 15 and 17, is a system capable of providing control to the two-wheeled omnidirectional drive system previously described. Independent motors may be servo motors, stepper motors, or other variants capable of both velocity and position control.

The sensor array 45 includes multiple sensors positioned, for example, in the main body 20 to sense proximity of obstacles, including humans. Multiple sensors, including redundant sensors, are preferred due to the need to avoid any collisions. Proximity sensors are used in the articulating arm 30 and in hand 60. Tactile sensors are also preferred in hand 60 to collect waste article(s) 23 without crushing or other damage. Optical sensors may be used to detect the type of waste by identifying container shapes, textual characters, recycling symbols, bar codes, QR codes, or the like. Multiple optical sensors will improve the opportunity of exposing an identifying symbol by locating optical sensors in the hand 60, on an exterior surface of the robot (such as the main body 20) and in the waste receptacle 21. Weight sensors may be used to detect the weight of a waste article 23, thereby increasing the opportunity to predict whether the waste article 23 is likely to be recyclable and, if so, what type of recyclable material. Weight sensors may also be used (in cooperation with slave computer 43 information and/or other sensors) to provide information in order to determine if any recyclable containers contain disposable waste such as any remaining beverage. If disposable waste is detected, a rotation of the hand 60, positioned over a waste receptacle 21 designated for trash, may be used to empty the recyclable waste article 23. Sensors capable of sensing the "full" state of one or more waste receptacle(s) 21 may be used. This may be a combination of optical sensors, weight sensors, or limit switches.

EXAMPLES

The following non-limiting examples of embodiments illustrate various features of the invention.

Example 1

Restaurant Application

Robot(s) 100 are configured to provide waste article 23 services in a restaurant. Restaurant environments impose significant challenges due to close proximity of dining tables, chairs, and humans. Tables will be comprised of various shapes, sizes, and heights.

Communication from the master computer 42 to the slave computer 43 provides robot(s) 100 with instructions such as a map of the area of interest, and information related to the shape, weight, or optical qualities of waste articles 23 most likely to be recycled in the specific restaurant environment. There may be other articles that are to be saved and collected but not disposed of, such as washable dinnerware. These may be programmed to be assigned to a specific waste receptacle 21 for later delivery to a kitchen, for example, for washing.

Robot(s) 100 may be signaled to a table by a host, a waitress, a customer, or other person. Robots may also patrol a region and identify a table requiring service by, for example, identifying waste but no human activity for a time period, then either make a decision to clear the table or request a decision from the host, waitress, customer, or another person. Robots(s) 100 traverse to the table, avoiding all obstacles, then determine a location from which to collect waste article(s) 23. Waste articles 23 which are normally recyclable, such as a beverage bottle, are identified by a robot 100. The type of recyclable material is sensed, then dispensed into the waste receptacle 21 pre-defined by the master computer 42.

Robot(s) 100 may traverse to the recycling unit to dispense the collected waste articles upon completion of a task, or when sensors detect one or more waste receptacle(s) 21 are full.

Example 2

City Park Application

Robot(s) 100 are configured to provide waste article 23 services in a city park having a surface acceptable to the drive system of the robot(s) 100. Maps of the area of interest are communicated from the master computer 42 to the slave computer 43. In this environment, there are likely to be primarily paper and styrofoam waste article(s) 23, but also recyclable beverage bottles. Thus, master computer 42 supplies data to slave computer 43 reflecting this unique environment, thereby improving the effectiveness of the robot.

Robot(s) 100 traverses the park environment, targeting areas provided in the map data, but also sensing other areas for waste which may be in unpredictable locations or surfaces. Waste article(s) 23 are collected and sorted at least according to recyclability. Depending on the desire for sorting recyclable waste additional waste receptacle(s) 21 may be used.

The embodiments of the invention as described herein are merely illustrative and are not exclusive. Numerous additions, variations, derivations, permutations, equivalents, combinations and modifications of the above-described invention will be apparent to persons of ordinary skill in the relevant arts. The invention as described herein contemplates the use of those alternative embodiments without limitation.

What is claimed is:

1. A method of vending, or collecting recycle refuse, using mechanized mobile merchantry, the method comprising:
    positioning at least one mechanized mobile merchantry configured to self-propel to a first designated geographical location, within a geographical boundary;
    signaling, by way of a consumer using a mobile device, the mechanized mobile merchantry to self-propel to and interact with the consumer at the consumer location;
    establishing a data communication link between the mobile device and a beacon device, the beacon device being operationally related to and positioned on the mechanized mobile merchantry, wherein the beacon device effectuates the ability of the mechanized mobile merchantry to locate and move, self-propelled, to a location of the mobile device; and
    effectuating by way of the mechanized mobile merchantry, selling of goods to, or collection of recycle refuse from, the consumer.

2. The method in accordance with claim 1, further comprising:
    socially adapting a persona of a human machine interface associated with the mechanized mobile merchantry upon approach by the consumer when the mechanized mobile merchantry can determine an identity or current activity of the consumer.

3. The method in accordance with claim 1, further comprising:
    issuing a reward to a consumer when the consumer deposits recycle refuse in the mechanized mobile merchantry which has been functionally adapted to provide at least recycle refuse collection, the reward comprising one or more of:
        a message posting to the consumer's social media page;
        a text based message;
        a photograph taken by or with the mechanized mobile merchantry.

4. The method in accordance with claim 1, wherein the effectuating further comprises:
    effectuating buying of goods by the consumer by way of mobile commerce, near field or similar wireless communications, consumer face recognition, or consumer biometric data.

5. The method in accordance with claim 1, further comprising:
    accepting at the mechanized mobile merchantry a verbal command from a consumer indicating which of a selection of inventory the consumer wants dispensed.

6. The method in accordance with claim 1, further comprising:
    collecting, by way of a perception sensor which is operationally related to the mechanized mobile merchantry, a plurality of facial recognition data associated with a consumer interacting with the mechanized mobile merchantry.

7. The method in accordance with claim 6, further comprising:
    utilizing the plurality of facial recognition data associated with the consumer to identify and data access an account associated with the consumer.

8. The method in accordance with claim 4, further comprising:
    illuminating lights which are arranged in a predefined pattern to express visually a plurality of emotional states.

9. The method in accordance with claim 1, wherein the effectuating further comprises:
    effectuating by way of the mechanized mobile merchantry, selling of services to the consumer.

10. The method in accordance with claim 9, wherein the effectuating further comprises:
    effectuating buying of services by the consumer by way of mobile commerce, near field or similar wireless communications, consumer face recognition, or consumer biometric data.

11. The method in accordance with claim 1, wherein the effectuating comprises:
    effectuating by way of the mechanized mobile merchantry, selling of beverages to the consumer.

12. A method of vending, or collecting recycle refuse, using mechanized mobile merchantry, the method comprising:
    positioning at least one mechanized mobile merchantry configured to self-propel to a first designated geographical location, within a geographical boundary;
    signaling, by way of a consumer using a mobile device, the mechanized mobile merchantry to self-propel to and interact with the consumer at the consumer location;
    establishing a data communication link between the mobile device and a beacon device, the beacon device being operationally related to and positioned on the mechanized mobile merchantry, wherein the beacon device effectuates the ability of the mechanized mobile merchantry to locate and move, self-propelled, to a location of the mobile device;
    effectuating by way of the mechanized mobile merchantry, selling of goods, including beverages, to, or collection of recycle refuse from, the consumer; and
    collecting, by way of a perception sensor which is operationally related to the mechanized mobile merchantry, a plurality of facial recognition data associated with a consumer interacting with the mechanized mobile merchantry.

13. The method in accordance with claim 12, further comprising:
    utilizing the plurality of facial recognition data associated with the consumer to identify and data access an account associated with the consumer.

14. The method in accordance with claim 12, further comprising:
    accepting at the mechanized mobile merchantry a verbal command from a consumer indicating which of a selection of inventory the consumer wants dispensed.

15. The method in accordance with claim 12, further comprising:
    socially adapting a persona of a human machine interface associated with the mechanized mobile merchantry upon approach by the consumer when the mechanized mobile merchantry can determine an identity or current activity of the consumer.

* * * * *